US011669501B2

(12) United States Patent
Brahma Raju et al.

(10) Patent No.: US 11,669,501 B2
(45) Date of Patent: Jun. 6, 2023

(54) ADDRESS MIRRORING OF A FILE SYSTEM JOURNAL

(71) Applicant: EMC IP Holding Company LLC, Hopkinton, MA (US)

(72) Inventors: Suraj Brahma Raju, Issaquah, WA (US); Max Laier, Seattle, WA (US); Ronald Steinke, Tacoma, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 260 days.

(21) Appl. No.: 17/083,955

(22) Filed: Oct. 29, 2020

(65) Prior Publication Data

US 2022/0138164 A1    May 5, 2022

(51) Int. Cl.
*G06F 16/00*      (2019.01)
*G06F 16/18*      (2019.01)
(Continued)

(52) U.S. Cl.
CPC ...... *G06F 16/1865* (2019.01); *G06F 11/1474* (2013.01); *G06F 16/13* (2019.01); *G06F 2201/87* (2013.01)

(58) Field of Classification Search
CPC ........ G06F 3/061; G06F 3/0631; G06F 3/064; G06F 3/067; G06F 3/0665; G06F 16/1734; G06F 11/1471; G06F 16/951; G06F 21/6227; G06F 16/2455; G06F 21/31; G06F 16/9535; G06F 16/2228; G06F 16/248;
(Continued)

(56) References Cited

U.S. PATENT DOCUMENTS 6,160,796 A    12/2000   Zou
6,578,160 B1    6/2003   MacHardy, Jr. et al.
(Continued)

FOREIGN PATENT DOCUMENTS

WO     2011002169     1/2011

OTHER PUBLICATIONS

Trimbee, "Dell EMC Powerscale ONEFS: A Technical Overview," Dell Technologies, White Paper, Jun. 2020, 42 pages.
(Continued)

*Primary Examiner* — Yicun Wu
(74) *Attorney, Agent, or Firm* — Amin, Turocy & Watson, LLP

(57) ABSTRACT

Techniques for address mirroring of a file system journal are presented. A transactional file system update can correspond to a write operation to be performed at a first participant node of a data storage system. A journal transfer component can transfer the transactional file system update from an initiator node of the data storage system to a first journal associated with the first participant node and recovery information relating to the update to a second journal associated with a second participant node of the data storage system. The recovery information can be determined based on the update. To facilitate the update, a journal descriptor block can be generated and sent to the second participant node, such block comprising the recovery information, which can include transaction state, block addresses involved in the transaction, error correction-related information, or a mirror block address set for the block addresses where desired.

20 Claims, 15 Drawing Sheets

(51) Int. Cl.
*G06F 11/14* (2006.01)
*G06F 16/13* (2019.01)

(58) Field of Classification Search
CPC .......... G06F 16/93; G06F 40/58; G06F 9/454; G06F 21/6218; G06F 16/9574; G06F 40/263; G06F 11/3664; G06F 11/3668; G06F 21/36; G06F 21/46; G06F 21/577; G06F 2221/2133; G06F 11/3414; G06F 11/3495; G06F 16/2452; G06F 16/9577; G06F 2201/875; G06F 2221/2141; G06F 16/00; G06F 16/316; G06F 3/04842; G06F 40/126; G06F 40/221; G06F 40/232; G06F 40/242; G06F 40/47; G06F 9/00
See application file for complete search history.

(56) References Cited

U.S. PATENT DOCUMENTS

| | | | |
|---|---|---|---|
| 6,668,262 B1 | 12/2003 | Cook | |
| 7,149,858 B1 | 12/2006 | Kiselev | |
| 7,617,259 B1 | 11/2009 | Muth et al. | |
| 7,739,546 B1 | 6/2010 | Rodrigues et al. | |
| 7,805,632 B1 | 9/2010 | Luke et al. | |
| 7,831,861 B1 | 11/2010 | Greene et al. | |
| 7,873,619 B1 * | 1/2011 | Faibish | G06F 16/13 707/823 |
| 8,775,381 B1 | 7/2014 | McCline et al. | |
| 9,020,987 B1 | 4/2015 | Nanda et al. | |
| 9,069,790 B2 | 6/2015 | Lord | |
| 9,367,579 B1 | 6/2016 | Kumar et al. | |
| 9,652,766 B1 | 5/2017 | Hattikudru et al. | |
| 9,892,041 B1 | 2/2018 | Banerjee et al. | |
| 10,037,251 B1 | 7/2018 | Bono et al. | |
| 10,289,690 B1 | 5/2019 | Bono et al. | |
| 10,635,552 B1 | 4/2020 | Raju et al. | |
| 10,719,481 B1 | 7/2020 | Baruch et al. | |
| 2002/0103816 A1 | 8/2002 | Ganesh et al. | |
| 2002/0143888 A1 | 10/2002 | Lisiecki et al. | |
| 2003/0158908 A1 | 8/2003 | Jacobs et al. | |
| 2006/0136685 A1 | 6/2006 | Griv et al. | |
| 2010/0235326 A1 | 9/2010 | Fashchik et al. | |
| 2013/0198142 A1 | 8/2013 | Madhavarapu et al. | |
| 2015/0006846 A1 * | 1/2015 | Youngworth | G06F 3/0689 711/216 |
| 2017/0091262 A1 | 3/2017 | Beard et al. | |
| 2017/0104820 A1 | 4/2017 | Golander et al. | |
| 2019/0243732 A1 | 8/2019 | Tati et al. | |
| 2019/0286613 A1 | 9/2019 | Bramante et al. | |
| 2020/0012442 A1 | 1/2020 | Yang | |
| 2020/0348851 A1 | 11/2020 | Grosman et al. | |
| 2021/0034709 A1 | 2/2021 | Patwardhan et al. | |
| 2021/0382799 A1 | 12/2021 | Kawaguchi | |

OTHER PUBLICATIONS

Trimbee, "Dell EMC Powerscale ONEFS Cluster Composition, Quorum, and Group State," Dell Technologies, White Paper, Jun. 2020, 21 pages.

Non-Final Office Action received for U.S. Appl. No. 16/943,576 dated Apr. 12, 2022, 61 pages.

Notice of Allowance received for U.S. Appl. No. 16/943,576 dated Sep. 14, 2022, 61 pages.

* cited by examiner

US 11,669,501 B2

ADDRESS MIRRORING OF A FILE SYSTEM JOURNAL

TECHNICAL FIELD

The subject application is related to data storage, e.g., to techniques for address mirroring of a file system journal.

BACKGROUND

A file system journal can be utilized to provide crash consistency for a data storage system. For instance, a write operation that would result in updates to one or more data blocks or metadata blocks of a storage drive associated with the data storage system initially can be logged on a journal associated with that storage drive. Once the relevant file system updates have been made durable and persistent on journal media of the journal, the logged updates (e.g., logged writes) can subsequently be transferred to the storage drive in the background. As a result, the journal can be utilized for storage drive recovery in the event of a failure of the write operation to the storage drive due to crashes, computing node failures, or other causes. However, if a file system journal becomes lost or inaccessible prior to recorded file system updates being completed successfully, the loss of the journal can result in a corresponding loss or inaccessibility of the data (e.g., the updates) on the corresponding storage drive(s).

The above-described description is merely intended to provide a contextual overview regarding data storage and updates to data in a data storage system, and is not intended to be exhaustive.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a method is described herein. The method can comprise, in connection with a write operation, communicating, by a system comprising a processor, a transactional file system update from an initiator node to a first journal associated with a first node, wherein the transactional file system update can correspond to the write operation to be performed at the first node. The method also can comprise communicating, by the system, recovery data relating to the transactional file system update from the initiator node to a second journal associated with a second node, wherein the recovery data can be determined based at least in part on the transactional file system update.

In another aspect, a system is described herein. The system can comprise a memory that stores computer executable components, and a processor that executes computer executable components stored in the memory. The computer executable components can comprise a write processor component that can generate a transactional file system update that can correspond to a write operation to be performed at a first participant node of a data storage system. The computer executable components can further include a journal transfer component that can transfer the transactional file system update from an initiator node of the data storage system to a first journal associated with the first participant node and recovery information relating to the transactional file system update to a second journal associated with a second participant node of the data storage system, wherein the recovery information can be determined based at least in part on the transactional file system update.

In yet another aspect, a machine-readable medium, comprising executable instructions, is described herein. The instructions, when executed by a processor, can facilitate performance of operations. The operations can comprise, in connection with a write operation, transmitting transactional file system update information from an initiator node to a first journal data store associated with a first node, wherein the transactional file system update information can correspond to the write operation to be performed at the first node. The operations also can comprise transmitting recovery information relating to the transactional file system update information from the initiator node to a second journal data store associated with a second node, wherein the recovery information can be determined based at least in part on the transactional file system update information.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
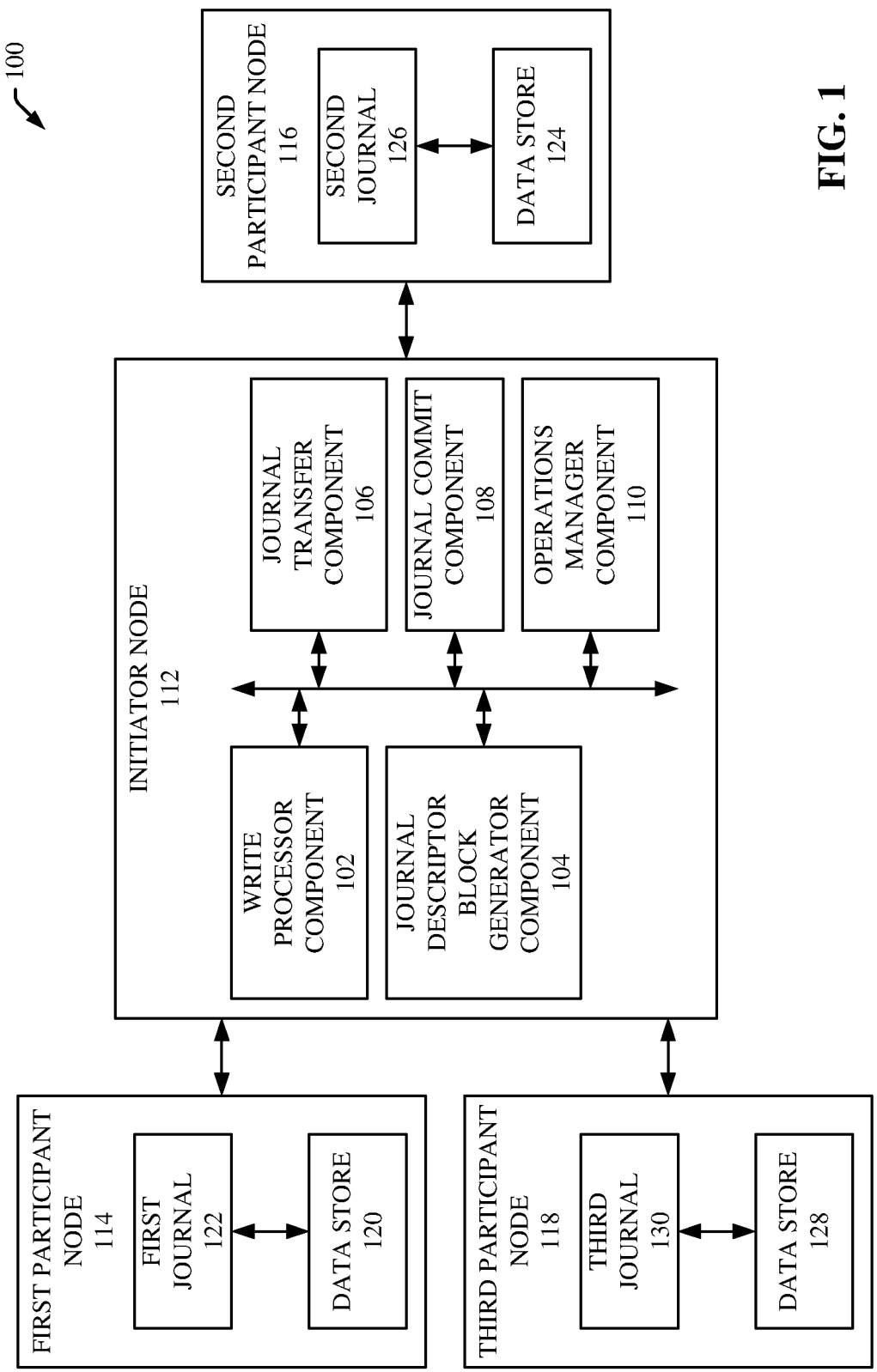
FIG. 1 illustrates a block diagram of a system that can facilitate address mirroring a file system journal to facilitate recovery of information relating to a transactional file system update if and when such information has been lost or is otherwise inaccessible, in accordance with various aspects and embodiments of the disclosed subject matter.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

As noted, a distributed data storage system with file system journaling can be configured such that any write from the file system to a storage component (e.g., storage drive) in the data storage system can initially be processed on a file system journal associated with the storage component. Subsequently, for example, in the background, write data of the write operations that is recorded on a file system journal can be transferred to the corresponding storage component. However, if a file system journal becomes lost or inaccessible prior to recorded file system updates being completed successfully, the loss of the file system journal can result in a corresponding loss or inaccessibility of the data (e.g., the updates associated with the write operations) on the corresponding storage component(s).

In an aspect, the contents of a file system journal can comprise transactional file system updates to the storage components associated with the file system journal. These transactional file system updates can, in turn, include transaction information, such as, for example, two-phase commit transaction information, and the file system updates (e.g., to the block(s) of the storage component(s) associated with the updates). To facilitate improved protection of the contents of a file system journal, techniques for address mirroring of a file system journal are presented. Various aspects and embodiments of the disclosed subject matter can be utilized to mirror the transaction information and a desirably small portion (e.g., a minimal) of recovery information that can correspond to a transactional file system update associated with (e.g., affiliated with) the corresponding transaction across multiple failure domains, such as will be described in further detail below. As a result, in the event of a file system journal failure on a node resulting in a loss or inaccessibility of the file system journal contents, the lost file system journal contents can be recovered using the recovery information from the created mirror.

For instance, with regard to a transaction involving a write operation to write data to a storage component of a first participant node of a data storage system, a write processor component can generate a transactional file system update corresponding to the write operation to be performed at the first participant node. A journal transfer component can transfer the transactional file system update from an initiator node of the data storage system to a first journal associated with the first participant node and recovery information relating to the update to a second journal associated with a second participant node of the data storage system, wherein the recovery information can be determined based at least in part on the update.

In some embodiments, to facilitate the transactional file system update and file system journal recovery (e.g., when recovery is desired, warranted, or necessary), a journal descriptor block generator component can generate a first journal descriptor block that can comprise the transactional file system update, first size information that can indicate a first size of the first journal descriptor block, and a first flag that can indicate a first purpose of the first journal descriptor block; and can generate a second journal descriptor block that can comprise the recovery information, second size data that can indicate a second size of the second journal descriptor block, and a second flag that can indicate a second purpose of the second journal descriptor block. The recovery information can comprise, for example, a state of the transaction, a first set of block addresses involved in the transaction (e.g., associated with the transactional file system update), error correction-related information (e.g., information, such as storage location information, that can be used to facilitate accessing error correction information and/or other associated information that can relate to the data being written to the first block of addresses), and/or a second set of mirror block addresses (e.g., a mirror block address set for the block addresses) where such second set of mirror block addresses is desired and/or applicable, wherein the second set of mirror block addresses can mirror the first set of block addresses and can be associated with (e.g., can be located in) a third participant node that is associated with (e.g., participating in) the transaction, as more fully described herein. The error correction-related information can comprise, for example, a data storage location identifier, such as a logical inode number (LIN), and offset information (e.g., an offset, such as a block or byte offset, that can indicate a particular storage location of information in or with regard to a file), wherein the data storage location identifier (e.g., LIN:offset pair) can indicate a data storage location in a node where error correction information associated with the write operation is stored. The error correction information can comprise, for example, error correction code (ECC), forward error correction (FEC) information, parity information (e.g., parity block or bits), and/or erasure coding information relating to the data being written to the first set of block addresses, as more fully described herein. A LIN can be a unique identifier that can refer to or identify a data storage structure (e.g., a data storage location or on-disk data structure) for a file or a directory in the file system, wherein the unique identifier can be unique with regard to a cluster of nodes.

In connection with the transaction, the journal transfer component can transfer the first journal descriptor block to the first participant node, and can transfer the second journal descriptor block, comprising the recovery information, to the second participant node. If there is a failure of the first journal associated with the first participant node resulting in loss or inaccessibility of the transaction information (e.g., the transactional file system update) in the first journal, the recovery information stored in the second journal (e.g., the mirror journal) associated with the second participant node can be utilized to identify and recover the contents, comprising the transaction information, of the lost first journal to enable the transactional file system update to be successfully performed.

In certain embodiments, additionally, a mirrored file system journal (e.g., second journal) can be used to rebuild a journal (e.g., first journal) on a given node (e.g., first participant node), which can thereby enable continuation of progress on any unresolved transactions as well as reconstruction of the corresponding file system updates.

By implementing the techniques for address mirroring of a file system journal as described herein, various advantages that can improve the functionality of a computing system, including a file system and data storage system, can be realized. These advantages can include, but are not limited to, the following. Computing resources (e.g., processor cycles, memory usage, power consumption, network bandwidth utilization, etc.) associated with recovery from disk (e.g., storage disk or drive) and/or journal failures can be reduced. Integrity of stored data can be improved in the event of a disk or journal failure. Storage overhead associated with redundancy protection for non-journal data can be reduced. The techniques for address mirroring of a file system journal described herein also can be hardware agnostic, can have desirably low performance overhead, can be desirably configurable, and do not have to have any dedicated network bandwidth, in order to enable desirable (e.g., efficient, suitable, acceptable, and/or optimal) recovery of lost or inaccessible contents of a journal to facilitate desirable performance of transactional file system updates, even if there is a journal failure. Various other advantages can be realized as well.

These and other aspects and embodiments of the disclosed subject matter will now be described with respect to the drawings.

With reference now to the drawings, FIG. 1 illustrates a block diagram of a system 100 that can facilitate address mirroring a file system journal to facilitate recovery of information relating to a transactional file system update if and when such information has been lost or is otherwise inaccessible, in accordance with various aspects and embodiments of the disclosed subject matter. The system 100 can comprise a write processor component 102, a journal descriptor block generator component 104, a journal transfer component 106, a journal commit component 108, and an operations manager component 110, each of which can function and operate as described in further detail herein. In accordance with various embodiments, the write processor component 102, journal descriptor block generator component 104, journal transfer component 106, journal commit component 108, and/or operations manager component 110 can be implemented in hardware, software, or a combination of hardware and software. By way of example, the write processor component 102, journal descriptor block generator component 104, journal transfer component 106, journal commit component 108, and/or operations manager component 110 can be implemented as computer-executable components, such as, for example, components stored in a memory and executed by a processor component (e.g., one or more processors). An example of a computer architecture including a processor and a memory that can be used to implement the write processor component 102, journal descriptor block generator component 104, journal transfer component 106, journal commit component 108, and/or operations manager component 110, as well as other components as will be described herein, is shown and described in further detail herein with respect to FIG. 15.

In an aspect, the write processor component 102, journal descriptor block generator component 104, journal transfer component 106, journal commit component 108, and/or operations manager component 110 can be associated with a computing node and/or other computing device associated with a file storage system and/or other data storage system. For instance, the write processor component 102, journal descriptor block generator component 104, journal transfer component 106, journal commit component 108, and/or operations manager component 110, as shown in system 100, each can be part of or associated with an initiator node 112 that can be utilized to initiate write operations within the system 100, for example, as described in further detail herein. Additionally or alternatively, the write processor component 102, journal descriptor block generator component 104, journal transfer component 106, journal commit component 108, and/or operations manager component 110, and/or other components as will be described in further detail herein, can be implemented within other computing nodes or devices, such as, for example, first participant node 114, second participant node 116, third participant node 118, and/or other suitable nodes or devices. Additionally, it should be appreciated and understood that the write processor component 102, journal descriptor block generator component 104, journal transfer component 106, journal commit component 108, and/or operations manager component 110, as well as additional other components as will be described in further detail herein, can be implemented at a same computing device (e.g., node) and/or distributed among multiple computing devices (e.g., multiple nodes).

The first participant node 114 can comprise a data store 120 that can store data (e.g., files, data, objects, metadata, other data structures, . . . ) and a first journal 122, which can be associated with (e.g., communicatively connected to) the data store 120. The second participant node 116 can comprise a data store 124 that can store data and a second journal 126, which can be associated with (e.g., communicatively connected to) the data store 124. The third participant node 118 can comprise a data store 128 that can store data and a third journal 130, which can be associated with (e.g., communicatively connected to) the data store 128. A data store (e.g., 120, 124, or 130, . . . ) can store respective items of data in respective data storage locations at or associated with respective block addresses, wherein each data storage location (e.g., block or storage block) can be associated with a unique block address, as more fully described herein. In some embodiments, each data store (e.g., 120, 124, or 130, . . . ) can comprise one or more data storage drives on or in which items of data can be stored.

The write processing component 102 can generate and/or otherwise obtain (e.g., receive) transactional file system updates that can correspond to a write operation to be performed at a first participant node 114 to write or update data (e.g., files, data, objects, metadata, other data structures, . . . ) to or in a data store 120 (e.g., data storage drive(s)) of the first participant node 114 (or other transactional file system updates that can correspond to other write operations to be performed at another node(s) to write or update data to or in a data store(s) of another node(s)). A transactional file system update can involve a file system update that can be wrapped in a transaction, wherein the file system update can involve a write or update to one or more files that can involve writing to or updating a number of blocks with regard to which it can be desirable (e.g., suitable, wanted, or necessary) to have transactional guarantees that such writes or updates will be successfully performed. Wrapping the file system update in a transaction, such as described herein, can ensure that desirable transactional guarantees can be provided with regard to the writing to or updating of the blocks associated with the file system update. A write operation for which file system updates can be generated or obtained by the write processing component 102 can comprise any suitable operation that can result in the creation or modification of any data stored in or to be stored in the first participant node 114, such as, for example, the creation and storage of data in one or more data blocks and/or the modification of data stored in one or more data blocks of or associated with the data store 120 (e.g., a storage drive or group of storage drives) of the first participant node 114. By way of example, a write operation can comprise creation of a new file (e.g., comprising data), object, or other data structure as well as any modification to any existing file, object, or other data structure. In an aspect, the write processing component 102 can similarly create and/or obtain transactional file system updates that can correspond to deletion or removal of a file, object, or other data structure from the first participant node 114 (e.g., from the data store 114 of the first participant node 114) using techniques that are similar to those described herein. In another aspect, the transactional file system updates processed by the write processing component 102 can comprise updates to one or more data and/or metadata blocks, such as, for example, data and/or metadata blocks to which a write operation is directed as well as transaction information associated with the write operation. Structures that can be utilized for transactional file system updates are described in further detail herein.

In some embodiments, as part of the write operation, in addition to performing the transactional file system updates to write or update data to or in the data store 120 of the first participant node 114, the write processing component 102 also can utilize the transactional file system updates to facilitate writing or updating the data to or in the data store 128 of the third participant node 118 and/or in another data store(s) (not shown) of another node(s) (not shown), such that there can be desired data redundancy in the system 100. That is, in connection with a write operation, redundant or mirror copies of data, or redundancy information in the form of erasure coding, associated with a transactional file system update can be written to two or more nodes (e.g., first participant node 114, third participant node 118, and/or another node(s) of the system 100). In accordance with various embodiments, the initiator node 112 (e.g., employing the write processing component 102 and/or another component of the initiator node 112) can employ a mirroring scheme, an erasure coding scheme, or a hybrid mirroring-erasure coding scheme to achieve desired data redundancy, such as described herein.

For example, if the redundancy is in the form of one or more mirror copies of the data being written to or updated in the first participant node 114, as part of the transactional file system update, the write processing component 102 can facilitate writing or updating the data (e.g., a first mirror copy of the data) to the first participant node 114, and the write processing component 102 also can facilitate writing or updating the same data (e.g., one or more other mirror copies of the data) to one or more other data stores (e.g., data store 128) of one or more other nodes (e.g., third participant node 118).

As another example, if the redundancy is in the form of a hybrid mirroring-erasure coding scheme with regard to the data being written to or updated in the first participant node 114, as part of the transactional file system update, the write processing component 102 (or another component of the initiator node 112) can generate error correction information (e.g., ECC, FEC, or parity information) relating to the data, or portion thereof, based at least in part on the data and a desired error correction algorithm and/or desired error correction function, which can be applied to the data to facilitate determining or generating the error correction information. The error correction algorithm and/or error correction function can relate to FEC or another type of error correction, and/or to erasure coding. For instance, if there are three blocks of data being written, the write processing component 102 (or another component of the initiator node 112) can mirror the first block of data, and can generate error correction information relating to the second and third blocks of data (e.g., generate a block of error correction information associated with the second and third blocks of data) based at least in part on the second and third blocks of data and the desired error correction algorithm and/or desired error correction function (e.g., based at least in part on application of the error correction algorithm and/or function to the second and third blocks of data). In some embodiments, the initiator node 112 or other component of the system 100 can associate the second block of data, third block of data, and the block of error correction information with each other to form a protection group. The write processing component 102 can facilitate writing a first portion of the data (e.g., first block of data) to the data store 120 of the first participant node 114, and can mirror the first portion of the data by facilitating writing the first portion of the data to one or more other data stores of one or more other nodes of the system 100 (e.g., of the cluster of nodes of the system 100). The write processing component 102 also can facilitate writing a second portion of the data (e.g., second block of data) and a third portion of the data (e.g., third block of data) to respective data stores of respective other nodes of the cluster of nodes, and can facilitate writing the error correction information (e.g., block of error correction information associated with the second and third blocks of data)

to, for example, the data store 128 of the third participant node 118. That is, if the write operation involves writing three blocks of data, for two of the blocks of data, the write processing component 102 (or the other component of the initiator node 112) can generate error correction information in the form of one block of error correction information (e.g., a parity block) that can relate to the two blocks of data. The other block (e.g., first block of data) can be mirrored, as described herein.

It is to be appreciated that, in other embodiments, the disclosed subject matter (e.g., the system 100) can utilize different, or different versions of, erasure coding or error correction schemes or techniques to provide desired redundancy and error correction to enable recovery of lost or inaccessible information when contents of a journal (e.g., first journal 122) are lost or inaccessible, or in other instances where recovery of lost or inaccessible information is desired. For instance, in other embodiments, the initiator node 112 can employ one block of error correction information for three blocks of data (in which case, as desired, erasure coding can be employed without mirroring when three blocks of data are involved in a particular write operation), or can employ two blocks of error correction information for three blocks of data (in which case, as desired, erasure coding can be employed without mirroring when three blocks of data are involved in a particular write operation), or can employ another desired erasure coding or error correction scheme or technique. In accordance with various embodiments, the error correction information can be FEC or another desired type of error correction information.

In some embodiments, the disclosed subject matter can utilize an erasure coding approach without mirroring, when appropriate. For example, if the write operation involves four blocks of data, and the erasure coding scheme involves generating one block of error correction information for two blocks of data, the write processing component 102 (or another component of the initiator node 112) can generate one block of error correction information for two of the blocks of data, and can generate another block of error correction information for the other two blocks of data, based at least in part on the respective blocks of data and a desired error correction algorithm and/or desired error correction function. The write processing component 102, for example, can facilitate writing the first block of data to a first node, a second block of data to a second node, a third block of data to a third node, and a fourth block of data to a fourth node; and can facilitate writing a first block of error correction information associated with the first and second blocks of data to another node (e.g., third node, fourth node, or another desired node), and can facilitate writing a second block of error correction information associated with the third and fourth blocks of data to still another node (e.g., first node, second node, or another desired node). It is to be appreciated and understood though that the respective blocks of data and/or the respective blocks of error correction information do not necessarily have to be written to respective nodes, although it can be desirable to write the respective blocks of data and/or the respective blocks of error correction information to respective nodes (e.g., it can be desirable to store a block of error correction information associated with first and second blocks of data in a different node than the node where the first block of data is stored and another node where the second block of data is stored).

The journal descriptor block generator component 104 can generate respective journal descriptor blocks for the first participant node 114, second participant node 116, and/or third participant node 118, in connection with, and to facilitate performance of, transactional file system updates associated with the first participant node 114. For instance, with regard to a transactional file system update to be performed on the first participant node 114, the journal descriptor block generator component 104 can determine and generate a first journal descriptor block that can comprise the transactional file system update (e.g., transactional file system update information), first size information that can indicate a first size of the first journal descriptor block, a first flag that can indicate a first purpose of the first journal descriptor block (e.g., perform transactional file system update on the first participant node 114), and/or other desired information.

With regard to the second participant node 116 associated with the transactional file system update to be performed on the first participant node 114, the second participant node 116 and associated second journal 126 can be a buddy participant for the transactional file system update in relation to the primary participant, which can be the first participant node 114 and associated first journal 122. In that regard, the journal descriptor block generator component 104 can determine and generate a second journal descriptor block that can comprise recovery information relating to the transactional file system update, second size information that can indicate a second size of the second journal descriptor block, a second flag that can indicate a second purpose of the second journal descriptor block (e.g., journal recovery of the first journal 122), and/or other desired information. The recovery information can comprise minimal or a relatively smaller amount of information relating to the transactional file system update to facilitate recovery of desired information relating to the transactional file system update to facilitate desirable performance of the transactional file system update on or at the first participant node 114 if and when there is a journal failure of the first journal 122 of or associated with the first participant node 114, wherein the minimal or relatively smaller amount of information relating to the transactional file system update can include less information that the information contained in the transactional file system update.

For example, the recovery information can comprise a state of the transaction, a first set of block addresses (e.g., in the data store 120) involved in the transaction (e.g., associated with the transactional file system update), error correction-related information (e.g., storage location information) associated with error correction information (e.g., ECC, FEC information, parity information (e.g., parity block or bits), and/or erasure coding) relating to the data being written to the first set of block addresses, and/or a second set of mirror block addresses (e.g., a mirror block address set for the block addresses) where such second set of mirror block addresses can be or are determined to be desired and/or applicable, wherein the second set of mirror block addresses can mirror the first set of block addresses and can be associated with (e.g., can be located in the data store 128 of) the third participant node 118 that is associated with (e.g., participating in) the transaction, as more fully described herein. The first set of block addresses can be the locations in the data store 120 of the first participant node 114 where the data of the write operation is to be written. The second set of block addresses can be the locations in the data store 128 of the third participant node 118 where the data of the write operation also is to be written. The error correction-related information can comprise, for example, a data storage location identifier (e.g., LIN and offset information, such as a block or byte offset, that can indicate a particular storage location of information in or with regard to a file), where the data storage location identifier (e.g., LIN:offset pair) can indicate a data storage location in a node (e.g., in data store 128 of the third participant node 118) where error correction information associated with the write operation is stored. For instance, the LIN information can comprise metadata that can be used to convert the offset to facilitate determining (e.g., by the first participant node 114) the actual block (e.g., physical block) in a data store (e.g., data store 128 of the third participant node 118) where the error correction information is stored. The error correction information can comprise, for example, ECC, FEC information, parity information (e.g., parity block or bits), and/or erasure coding information relating to the data being written to the first set of block addresses, as more fully described herein. A LIN can be a unique identifier that can refer to or identify a data storage structure (e.g., a data storage location or on-disk data structure) for a file or a directory in the file system, wherein the LIN can be unique with regard to a cluster of nodes. The first set of block addresses, the second set of block addresses, and/or other blocks addresses of other nodes of a cluster of nodes, each can be or can comprise cluster wide unique block addresses with regard to the cluster of nodes, wherein the cluster of nodes can comprise, for example, the initiator node 112, first participant node 114, second participant node 116, third participant node 118, and/or one or more other nodes of the system 100.

In certain embodiments, the system 100 can employ an addressing scheme, which can be used for data and metadata, and can be indexed in the form of (node, drive, offset). For instance, the first participant node 114 can have a node identifier of 1, the second participant node 116 can have a node identifier of 2, the third participant node 118 can have a node identifier of 3, and so on. Each node can have a set of storage drives (e.g., disk drives) in which data can be stored. For each node, there can be a drive parameter or identifier associated with each drive of the node. For example, a first drive can have a drive identifier of 1, a second drive can have a drive identifier of 2, a third drive can have a drive identifier of 3, and so on. For each drive, there can be a set of offsets, wherein respective offsets can relate to respective storage locations (e.g., respective physical block addresses) of the drive. For a drive, there can be offset parameter or identifier associated with each offset. For example, a first offset can have an offset parameter value of 1, a second offset can have an offset parameter value of 2, a third offset can have an offset parameter value of 3, and so on. In this example addressing scheme, if the (node, drive, offset) is (3:2:4) with regard to a particular block of data, the index (3:2:4) can indicate that the block of data is stored on the second drive of the third participant node 118 at a fourth location (e.g., fourth offset location or position, or physical address) on the second drive. It is to be appreciated and understood that this example addressing scheme is but one exemplary addressing scheme, and, if and as desired, another type of addressing scheme can be utilized in accordance with the disclosed subject matter.

In some embodiments, with regard to LINs and offsets, the system 100 can employ a tree structure, such as a LIN tree structure, that can map a particular offset in a particular file to a particular physical block in a data store. That is, the LIN tree structure can comprise a mapping between the logical offset and physical data blocks in the data stores of nodes in a cluster of nodes. When desiring to locate data (e.g., block of data, or block of error correction information) stored in some storage location in some node of the cluster, a node (e.g., first participant node 114) can analyze or reference the LIN tree structure to look up and find a LIN and offset associated with the data (e.g., using LIN and offset information retrieved from recovery information stored in the second journal 126, during a recovery or restoration operation), and from the LIN, the offset, and the mapping in the LIN tree structure, the node can identify the particular storage location (e.g., the node, drive, offset) in a particular node where the data is stored. In certain embodiments, with regard to a protection group comprising, for example, two blocks of data and a block of error correction information (e.g., the second block of data, third block of data, and associated block of error correction information, from a previous example described herein) stored in respective storage locations in respective nodes of the cluster of nodes, LIN and offset information can be associated with the protection group such that, if a LIN and offset associated with one of the blocks in the protection group is referenced or looked up in the LIN tree structure, a node (e.g., first participant node 114 or other node) can identify or determine the other blocks that are in the protection group and/or the other storage locations of the other blocks that are in the protection group.

The journal transfer component 106 can transfer transactional file system updates received from the write processing component 102 from the initiator node 112 (e.g., a node of system 100 from which the underlying write operation can originate) to the first journal 122 at or associated with the first participant node 114 to facilitate performance of the transactional file system updates. For instance, with regard to the transactional file system update, the journal transfer component 106 can transfer the first journal descriptor block that can comprise the transactional file system update, the first size information, the first flag, and/or other desired information to the first journal 122. The journal transfer component 106 also can transfer other information, such as, for example, a generation indicator (as more fully described herein) associated with the data storage system of the system 100 (e.g., data storage system formed by the nodes of the system 100), a first transaction block, and/or other desired information to the first journal 122 of or associated with the first participant node 114, in connection with the transactional file system update, wherein the generation indicator and/or the first transaction block can be part of the first journal descriptor block, or can be separate from and associated with (e.g., logically or physically linked or connected to) the first journal descriptor block. The first transaction block can comprise, for example, metadata relating to the transactional file system update, as more fully described herein.

The journal transfer component 106 also can transfer recovery information, which can relate to the transactional file system updates received from the write processing component 102, from the initiator node 112 to the second journal 126 at or associated with the second participant node 116 to facilitate recovery of desired information relating to the transactional file system update to facilitate desirable performance of the transactional file system update on or at the first participant node 114 if and when there is a journal failure of the first journal 122. For instance, with regard to the transactional file system update, the journal transfer component 106 can transfer the second journal descriptor block that can comprise the recovery information relating to the transactional file system update, the second size information, the second flag, and/or other desired information to the second journal 126. The journal transfer component 106 also can transfer other information, such as, for example, the generation indicator associated with the data storage system, second transaction block, and/or other desired information to the second journal 126 of or associated with the second participant node 116, in connection with the transactional file system update, wherein the generation indicator and/or second transaction block can be part of the second journal descriptor block, or can be separate from and associated with the second journal descriptor block. The second transaction block can be the same as, or can correspond to, the first transaction block, and the second transaction block can comprise, for example, metadata relating to the transactional file system update.

In certain embodiments, to facilitate desired data redundancy in the system 100, in addition to performing the transactional file system update to write or update data to or in the data store 120 of the first participant node 114, to facilitate writing or updating the data of the write operation to or in the data store 128 of the third participant node 118, the journal transfer component 106 can transfer a third first journal descriptor block that can comprise the transactional file system update, third size information that can indicate a third size of the third journal descriptor block, a third flag that can indicate a third purpose of the third journal descriptor block (e.g., perform transactional file system update on the third participant node 118, for example, in connection with performing the same transactional file system update on the first participant node 114), and/or other desired information to the third journal 130 at or associated with the third participant node 118. The journal transfer component 106 also can transfer other information, such as, for example, the generation indicator, a third transaction block, and/or other desired information to the third journal 130, in connection with the transactional file system update, wherein the generation indicator and/or the third transaction block can be part of the third journal descriptor block, or can be separate from and associated with (e.g., logically or physically linked or connected to) the third journal descriptor block. The third transaction block can comprise, for example, metadata relating to the transactional file system update, as more fully described herein. The third journal descriptor block and third transaction block can be similar to the corresponding first journal descriptor block and first transaction block, respectively.

In some embodiments, similar to the second participant node 116 and associated second journal 126 being the buddy participant for the transactional file system update in relation to the first (e.g., primary) participant node 114 and associated first journal 122, the system 100 can comprise a fourth participant node (not shown) and associated fourth journal (not shown) that can be a buddy participant for the transactional file system update in relation to the third (e.g., another primary) participant node 118 and associated first journal 130. Similar to what is done with regard to the second participant node 116 and second journal 126, the journal transfer component 106 also transfer corresponding recovery information (e.g., minimal recovery information), which can relate to the transactional file system update associated with the third participant node 118, from the initiator node 112 to the fourth journal of or associated with the fourth participant node to facilitate recovery of desired information relating to the transactional file system update to facilitate desirable performance of the transactional file system update on or at the third participant node 118 if and when there is a journal failure of the third journal 130. Similar to the recovery information associated with the second journal 126, the corresponding recovery information associated with the fourth journal can comprise, for example, a state of the transaction associated with the third participant node 118, a third set of block addresses (e.g., in the data store 128) involved in the transaction, error correction-related information relating to error correction information associated with the data being written to the third set of block addresses, and/or another set of mirror block addresses (e.g., a mirror block address set for the block addresses) where such other set of mirror block addresses (e.g., associated with another node) can be or are determined to be desired and/or applicable. In certain embodiments, the other set of mirror block addresses can be the first set of block addresses of the data store 120 of the first participant node 114, as the same data is being written to the first set of block addresses and the third set of block addresses.

In some embodiments, the second participant node 116 and/or the second journal 126 at or associated with the second participant node 116 can be logically distinct from the first participant node 114 and/or the first journal 122 at or associated with the first participant node 114, and/or can be logically distinct from the third participant node 118 and/or the third journal 130 at or associated with the third participant node 118. By mirroring (e.g., address mirroring) the file system updates across multiple journals, such as, for example, the first journal 122 and second journal 126, at logically distinct participant nodes, such as, for example, the first participant node 114 and second participant node 116, the journal transfer component 106 can facilitate the recording of file system updates and underlying transaction data across multiple fault domains, which can thereby increase and/or enhance (e.g., improve or optimize) the resiliency of the respective journals (e.g., 122 and 126) to journal or node failures. While only one initiator node 112 and three participant nodes 114, 116, and 118 are shown in FIG. 1, it should be appreciated and understand that, in some embodiments, the system 100 can utilize any desired (e.g., suitable, acceptable, or optimal) number of initiator nodes (e.g., initiator node 112) and/or participant nodes (e.g., first participant node 114, second participant node 116, and/or third participant node 118, . . . ).

In certain embodiments, the journal commit component 108 can facilitate commitment of the transactional file system updates transferred by the journal transfer component 106 to the respective journals, such as, for example, first journal 122, second journal 126, and/or third journal 130 of or associated with the participant nodes, such as, for example, the first participant node 114, second participant node 116, and/or third participant node 118, respectively. In some embodiments, the journal commit component 108 can facilitate committing the transactional file system updates to the respective journals (e.g., 122, 126, and/or 130) via a two-phase commit (2PC) transaction, such as, for example, a 2PC version 2 (2PCv2) transaction. An example of a 2PC transaction that can be utilized by the journal commit component 108 is described in further detail herein with respect to FIG. 5.

The operations manager component 110 can control (e.g., manage) operations associated with the initiator component 112 and/or the system 100 overall. For example, the operations manager component 110 can facilitate generating instructions to have components of the initiator component 112 perform operations, and can communicate respective instructions to respective components of the initiator component 112 (e.g., write processor component 102, journal transfer component 106, journal descriptor block generator component 108, . . . , processor component, and/or data store of or associated with the initiator component 112) to facilitate performance of operations by the respective components of the initiator component 112 (or other components of the system 100) based at least in part on the instructions, in accordance with defined transaction management criteria and transaction management algorithms (e.g., transaction management algorithms, journal descriptor block generation algorithms, initiator node and/or participant node selection algorithms, transaction commit algorithms, and/or journal recovery algorithms, etc., as disclosed, defined, recited, or indicated herein by the methods, systems, and techniques described herein). The operations manager component 110 also can facilitate controlling data flow between the respective components of the initiator component 112 and controlling data flow between the initiator component 112 and another component(s) or device(s) (e.g., first participant node 114, second participant node 116, third participant node 118, communication devices, network devices of a communication network, data sources, services, or applications, . . . ) associated with (e.g., connected to) the initiator component 112.

While the first participant node 114, second participant node 116, third participant node 118, and initiator node 112 shown in system 100 can be logically distinct and are illustrated as distinct entities, it is to be appreciated and understood that, in accordance with various embodiments of the disclosed subject matter, the first participant node 114, second participant node 116, third participant node 118, and initiator node 112 do not have to be physically distinct from each other, although, as desired, they can be physically distinct from each other. For example, the first participant node 114, second participant node 116, third participant node 118, and/or initiator node 112 can be housed by a common physical chassis and/or other apparatus while being logically separate system nodes that can be logically separate from each other. Alternatively, the first participant node 114, second participant node 116, third participant node 118, and/or initiator node 112 can be located in respective (e.g., different) physical devices that can be physically distinct and separate from each other, and can be configured to communicate with each other via any suitable wired or wireless communication protocol.

In some embodiments, as desired, in a distributed file system, the functionality of a participant node (e.g., first participant node 114, second participant node 116, or third participant node 118) can be distributed among multiple physical devices. For instance, a file that is the subject of a file system transaction (e.g., file creation, modification, or removal, etc.) can be associated with a corresponding set of data and/or metadata blocks that can be stored across a given physical cluster of nodes of the system 100. To this end, the initiator node 112, for example, via the write processing component 102 and/or other suitable mechanisms, can determine the files and/or blocks (e.g., data storage blocks) that are to be updated as the result of a given transaction and subsequently can identify the physical devices and/or clusters on which those blocks are located. These identified devices and/or clusters, in turn, can be designated as the participant nodes (e.g., first participant node 114 and/or one or more other first (e.g., primary) participant nodes) of the system 100 with regard to the given transaction.

In an aspect, system 100 as shown in FIG. 1 can be utilized to employ a hardware agnostic, initiator-driven address mirroring paradigm with regard to journals to facilitate journal recovery if and when desired. As described herein, in connection with a transactional file system update to update the first participant node 114 as part of a write operation, the initiator node 112 can generate mirror information relating to the transactional file system update, which can comprise recovery information relating to the transactional file system update, send the mirror information to a set of additional (e.g., different) participants, such as, for example, one or more secondary participant nodes (e.g., second participant node 116), in connection with sending the transactional file system update to the first (e.g., primary) participant node 114. As a result, for each primary participant node (e.g., first participant node 114), an additional participant(s) (e.g., second participant node 116 and associated second journal 126) on a separate journal failure domain can be assigned by the system 100 (e.g., by the initiator component 112, such as, for example, the operations manager component 110 of the initiator component 112, or another desired component of the system 100). As a result, in the event of a journal failure of a primary participant (e.g., first participant node 114), mirror information, comprising recovery information, that can mirror address information (e.g., block address information) and/or other desired information of the journal (e.g., first journal 122) of the primary participant can be available at the additional journal (e.g., second journal 126) of or associated with the additional (secondary) participant (e.g., second participant node 116) for use in recovery of the information relating to the transactional file system update that was lost or rendered inaccessible by or at the journal (e.g., first journal 122) of the primary participant. As is described herein, and as will be described in further detail with respect to FIG. 5, secondary participants (e.g., second participant node 116) can be logically separate 2PCv2 participants, and therefore can be isolated and can operate in parallel with respective other participants (e.g., initiator node 112 and/or first participant node 114) involved in the transaction.

Figure 2:
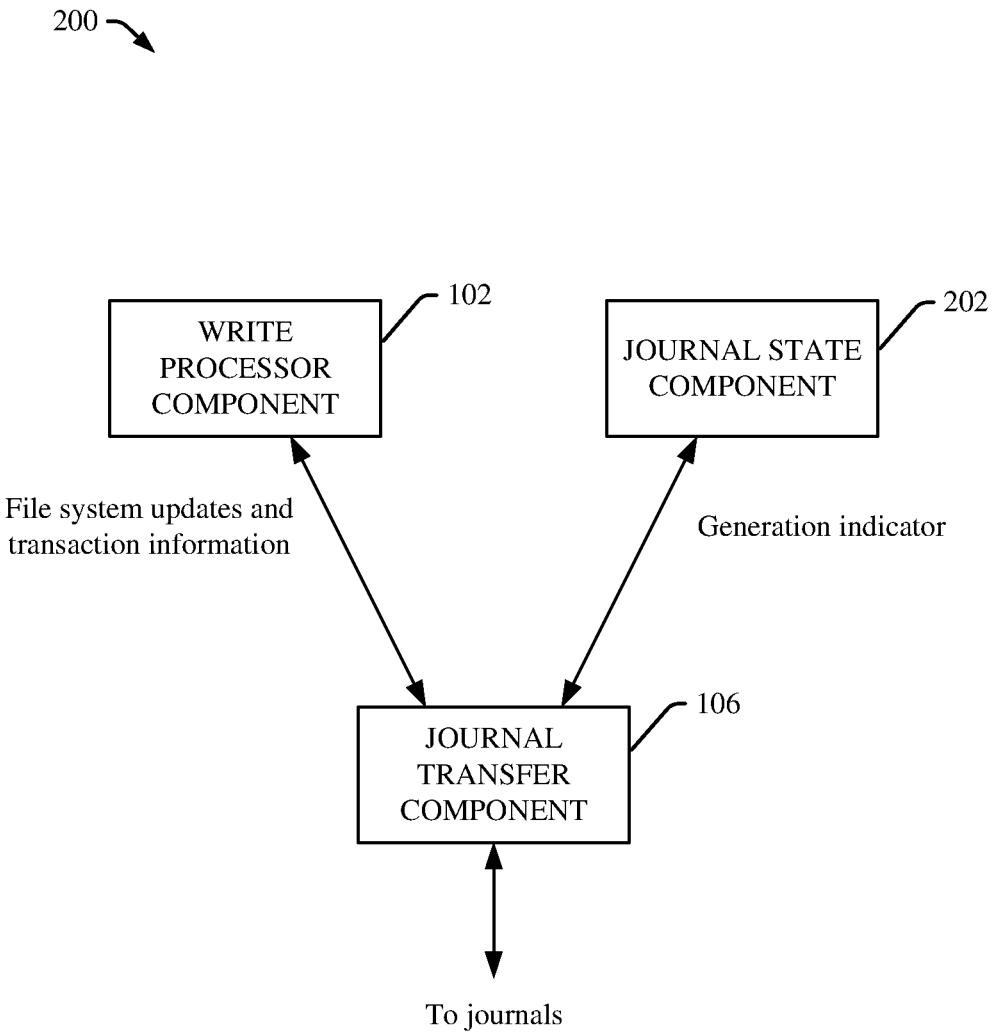
FIG. 2 depicts a block diagram of a system that can facilitate management and communication of file system journal state information in connection with performance of transactional file system updates, in accordance with various aspects and embodiments of the disclosed subject matter.

Turning to FIG. 2 (along with FIG. 1), FIG. 2 depicts a block diagram of a system 200 that can facilitate management and communication of file system journal state information in connection with performance of transactional file system updates, in accordance with various aspects and embodiments of the disclosed subject matter. Repetitive description of like elements employed in other embodiments described herein is omitted for brevity. As shown in FIG. 2, the write processor component 102 can provide (e.g., send, transmit, or communicate) transactional file system updates, transaction information, and/or other desired (e.g., appropriate or suitable) information to the journal transfer component 106, for example, as more fully described herein. In addition, the system 200 can comprise a journal state component 202 that can obtain a generation indicator (e.g., generation information) that is associated with the system 200 and/or can obtain or generate state information relating to the state of the transaction, for example, in response to initiation of a write operation as handled by the write processor component 102. In some embodiments, the journal state component 202 can be part of the initiator node 112; and, in other embodiments, the journal state component 202 can be part of another node or can be a stand-alone component. With regard to the transactional file system update, which can correspond to the write operation, the journal transfer component 106 can transfer the generation indicator along with or as part of the first journal descriptor block, which can comprise the transactional file system update (e.g., as provided by the write processor component 102), the state information relating to the state of the transaction, the first size information that can indicate the first size of the first journal descriptor block, the first flag that can indicate the first purpose of the first journal descriptor block, and/or other desired information to one or more journals, such as, for example, the first journal 122 of or associated with the first participant node 114, as more fully described herein.

The journal transfer component 106 also can transfer the generation indicator (e.g., copy of the generation indicator) along with or as part of the second journal descriptor block, which can include the recovery information relating to the transactional file system update (e.g., the state information relating to the state of the transaction, the first set of block addresses involved in the transaction, error correction-related information, and/or the second set of mirror block addresses), the second size information that can indicate the second size of the second journal descriptor block, the second flag that can indicate the second purpose of the second journal descriptor block, and/or other desired information to one or more other journals (e.g., one or more buddy journals), such as, for example, the second journal 126 of or associated with the second participant node 116, as more fully described herein.

In some embodiments, if and when the third participant node 118 is employed as part of executing the transaction to facilitate desired data redundancy with regard to the transaction, the journal transfer component 106 can transfer the generation indicator along with or as part of the third journal descriptor block, which can comprise the transactional file system update, the state information relating to the state of the transaction, the third size information that can indicate the third size of the third journal descriptor block, the third flag that can indicate the third purpose of the third journal descriptor block, and/or other desired information to the third journal 130 of or associated with the third participant node 114, as more fully described herein.

In an aspect, a generation indicator can be associated with each primary journal (e.g., first journal 122) in the data storage system to track state changes associated with the primary journal. In some embodiments, the generation indicator can be a numeric value (e.g., a generation number), which can be configured as a monotonically increasing value and/or in any other suitable manner. In other embodiments, the system 200 can utilize another type(s) of generation indicator or generation information, such as timestamp information (e.g., timestamps) that can indicate a relevant time (e.g., time of initiation of a transaction) with regard to a transaction being performed by the system 200.

In a further aspect, the journal state component 202 can utilize a group management protocol (GMP) to publish the generation indicator of the primary journal (e.g., first journal 120) to its associated group (e.g., second journal 126 and/or second participant node 116; and/or third journal 130 and/or third participant node 118). In certain embodiments, the journal state component 202 can be configured to update the generation indicator corresponding to a given primary journal (e.g., first journal 122) in response to a change of operational state of at least one participant (e.g., first participant node 114, second participant node 116, and/or third participant node 118) associated with the primary journal (e.g., first journal 122), such as, for example, a primary participant to which the primary journal belongs and/or one or more secondary participants on which certain information (e.g., address information and/or other recovery information) relating to the primary journal is mirrored with regard to the transaction. For instance, the journal state component 202 can update the generation number or indicator of the primary journal (e.g., first journal 122) on a secondary participant (e.g., second participant node 116 and/or second journal 126) disconnect (e.g., a GMP split operation), secondary participant connect (e.g., a GMP merge operation), or a secondary participant entering a read-only mode (e.g., via a GMP configuration (config) operation), etc. For every primary participant (e.g., first participant node 114 and/or associated first journal 122), the transaction initiator (e.g., the initiator node 112, which can comprise the journal state component 202) can fetch the corresponding generation indicator (e.g., generation number or other generation information) from the GMP group information associated with the group of nodes.

Figure 3:
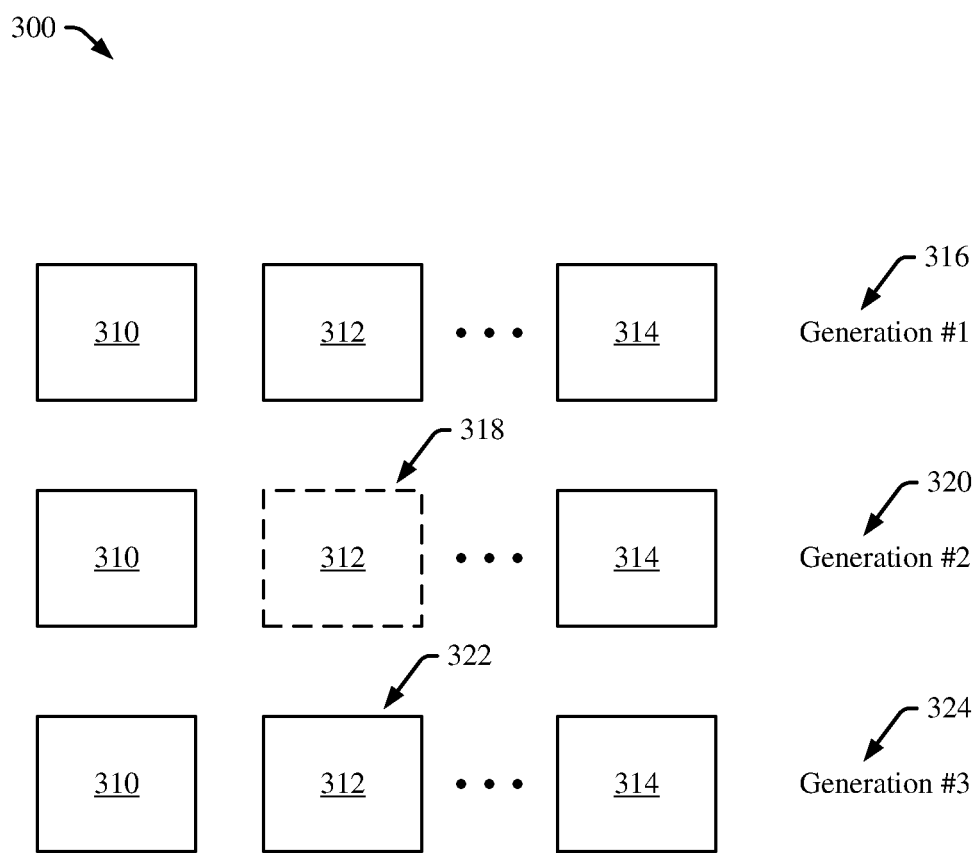
FIG. 3 depicts a block diagram of example generations associated with nodes that can illustrate changes to a generation indicator that can be performed for a group of nodes, that can be associated with a given primary journal, in accordance with various aspect and embodiments of the disclosed subject matter.

By way of illustrative example, referring briefly to FIG. 3 (along with FIGS. 1 and 2), FIG. 3 depicts a block diagram of example generations 300 associated with nodes that can illustrate changes (e.g., updates or modifications) to a generation indicator that can be performed for a group of nodes, such as nodes 310, 312, 314, that can be associated with a given primary journal, in accordance with various aspect and embodiments of the disclosed subject matter. As illustrated in the example generations 300, nodes 310, 312 and 314 each initially can be in an operational state and can be associated with an initial generation number, such as, for example, generation 1 (as indicated at reference numeral 316). As further shown by example generations 300, the node 312 subsequently can become unavailable (e.g., by going offline, entering a read-only mode, etc., as denoted by a dashed outline and reference numeral 318), and as a result the generation number can be updated, for example, to generation 2 (as indicated at reference numeral 320) by the journal state component 202, which can detect or receive information that can indicate that the operational state of the node 312 had changed. If and when the node 312 returns to an available state (e.g., by going online, as denoted by the (once again) solid outline and reference numeral 322), as shown in the example generations 300, the generation number can again be updated, e.g., to generation 3 (as indicated at reference numeral 324) by the journal state component 202, which can detect or receive information that can indicate that the operational state of the node 312 had changed (again).

As shown by the diagram of the example generations 300, on any disconnection of a secondary participant (e.g., node 312), the corresponding primary participant (e.g., node 310) can update its generation indicator (e.g., by increasing or bumping its generation number, etc.) as part of the ensuing GMP split. On any secondary participant (e.g., node 312) reconnecting, the corresponding primary participant (e.g., node 310) can update its generation indicator and publish the generation change to the group of nodes (and/or the constituent or associated journals) via the corresponding GMP merge. Any transaction resolution or cleanup blocked on the disconnected secondary participant can happen, for example, on Remote Block Manager (RBM) connect callbacks. On reconnect, a secondary participant (e.g., node 312) also can query the state of the transaction(s) from the primary participant (e.g., node 310) using RBM connect callbacks and/or by other desired means or mechanisms, and can clean up any flushed transaction(s). In an aspect, RBM connect callbacks, as well as other RBM messages, can be utilized (e.g., by the nodes of the group) to implement remote procedure call (RPC) in a distributed file system.

Figure 4:
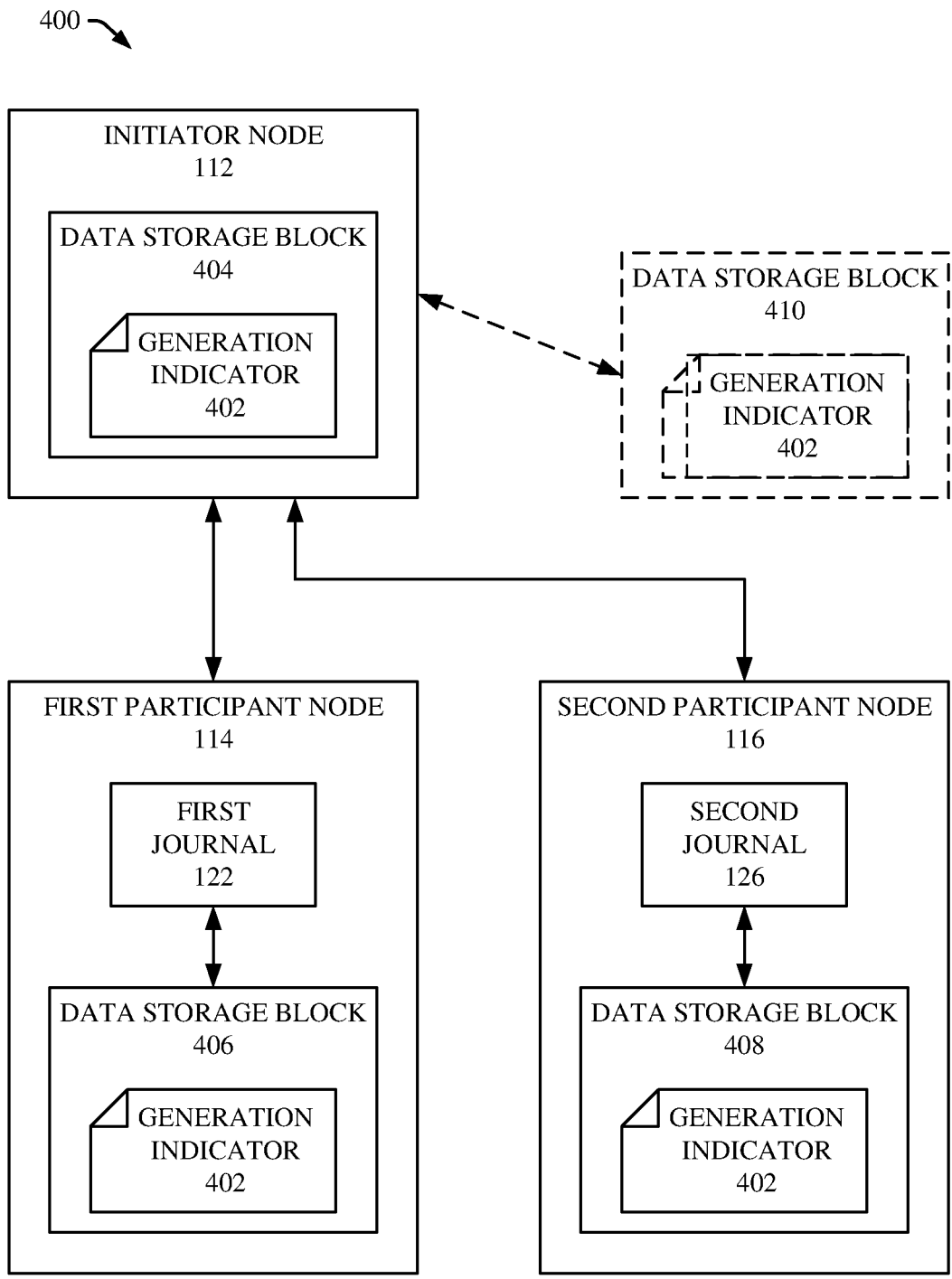
FIG. 4 illustrates a block diagram of an example system that can store generation indicators outside of journals associated with a transaction (in addition to or as an alternative to storing generation indicators within the journals) to facilitate desirable identification of a generation indicator for the transaction, in accordance with various aspects and embodiments of the disclosed subject matter.

In some embodiments, a generation indicator, which can correspond to a primary journal, can be stored outside of the respective failure domains of each associated primary journal (e.g., first journal 122) and secondary journal (e.g., second journal 126), and/or another journal (e.g., third journal 130) associated with the transaction. In that regard, referring briefly to FIG. 4 (along with FIGS. 1 and 2), FIG. 4 illustrates a block diagram of an example system 400 that can store generation indicators outside of journals associated with a transaction (in addition to or as an alternative to storing generation indicators within the journals) to facilitate desirable identification of a generation indicator (e.g., current or applicable generation indicator) for the transaction, in accordance with various aspects and embodiments of the disclosed subject matter. For instance, the example system 400 can comprise the initiator node 112, first participant node 114, and second participant node 116 associated with a transaction (e.g., transaction relating to a write operation to write or update data to the first participant node 114). For reasons, or brevity and clarity, the third participant node 118 is not explicitly shown in FIG. 4).

The initiator node 112 or another component of the system 400 (e.g., the initiator node 112, the journal state component 202 (of or associated with the initiator node 112), or another desired component) can store a generation indicator 402 in a data storage block 404 of the initiator node 112, a data storage block 406 of the first participant node 114 outside of the first journal 120, and/or a data storage block 408 of the second participant node 116 outside of the second journal 122. In some embodiments, the data storage block (e.g., 404, 406, or 408) of a node (e.g., initiator node 112, first participant node 114, or second participant node 116) can be a node state block (NSB), which can be a per-node disk block (e.g., data storage block on disk) that can be mirrored across respective drives (e.g., data stores or data storage drives) in a given node and can be used to hold (e.g., store) the current journal generation (e.g., current or applicable generation indicator) and/or other desired bootstrapping information. Additionally or alternatively, the initiator node 112 or the other component of the system 400 can store the generation indicator 402 in any other suitable data or metadata block(s) that can be distinct from the journal (e.g., first journal 122 and/or second journal 126) and can be mirrored (e.g., copied) across the nodes (e.g., 112, 114, 116, and/or 118) and their respective drives (e.g., data stores or data storage drives). For instance, the initiator node 112 or the other component of the system 400 can store the generation indicator 402 in a data storage block 410 that can be associated with (e.g., communicatively connected to) the initiator node 112, first participant node 114, and/or second participant node 116. The redundancy of storage of the generation indicator 402 across various data storage locations (e.g., data storage block(s) 404, 406, 408, and/or 410) can facilitate recovery and identification of the generation indicator to enable the initiator node 112, first participant node 114, and/or second participant node 116 to identify or determine the current generation associated with a transaction based at least in part on the recovered generation indicator, if, for instance, the generation or generation indicator has been lost or is otherwise inaccessible to the initiator node 112, first participant node 114, and/or second participant node 116.

Figure 5:
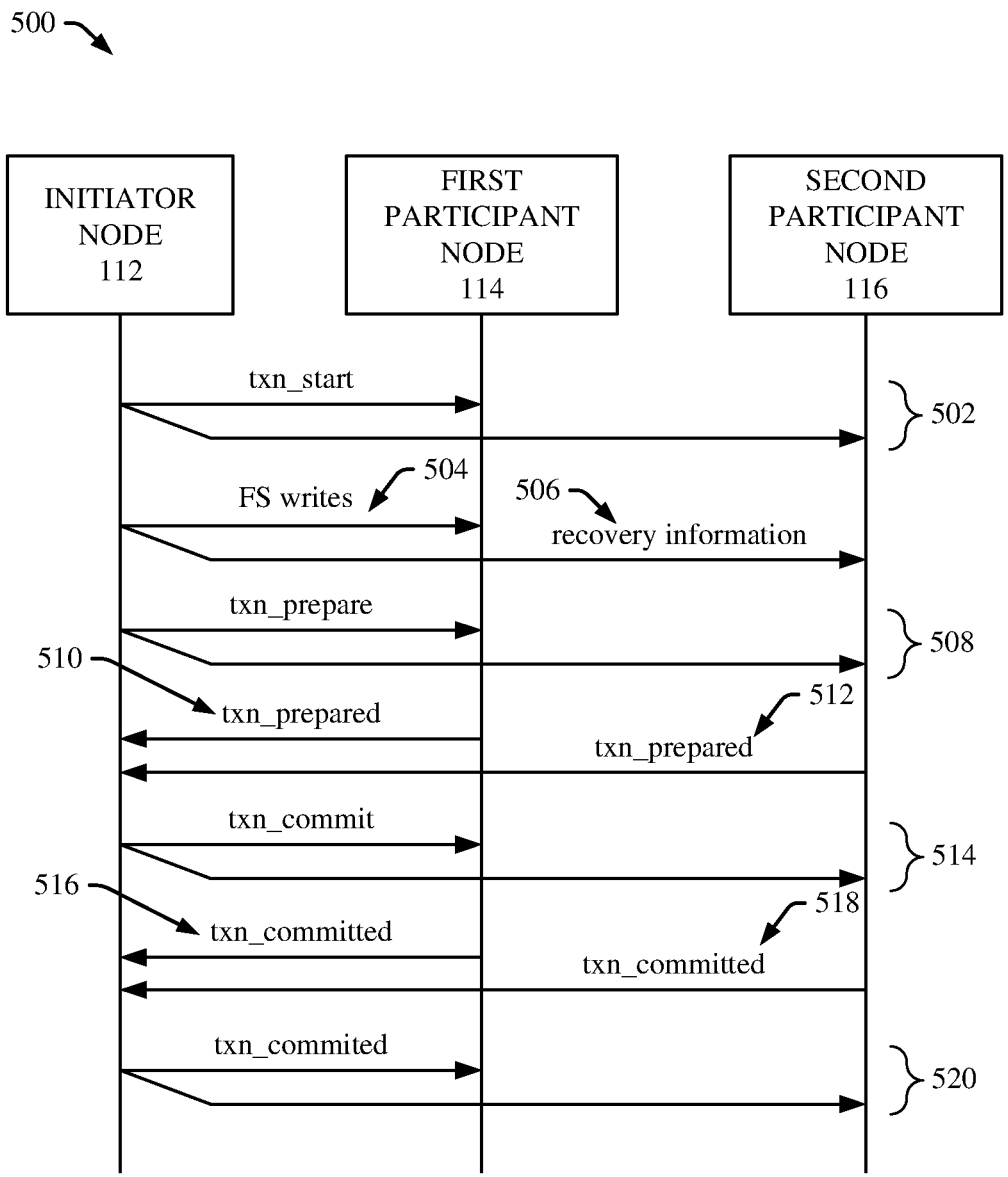
FIG. 5 depicts a block diagram of an example messaging flow for mirroring certain information (e.g., address information or other desired recovery information) of a file system journal, in accordance with various aspects and embodiments of the disclosed subject matter.

Turning to FIG. 5 (along with FIG. 1), FIG. 5 depicts a block diagram of an example messaging flow 500 for mirroring certain information (e.g., address information or other desired recovery information) of a file system journal (e.g., via a 2PC transaction), in accordance with various aspects and embodiments of the disclosed subject matter. The example messaging flow 500 can be conducted between an initiator node 112 that can initiate updates to one or more data or metadata blocks (e.g., one or more blocks corresponding to a file, etc.), a first participant node 114 (e.g., primary participant) that can be associated with the respective blocks to be updated and a first journal 122 (e.g., primary journal) that can correspond to the transaction, and a second participant node 116 (e.g., a secondary or buddy participant) that can be associated with a second journal 126 (e.g., a secondary or buddy journal) that can correspond, at least in part, to the first journal 122 of the first participant node 114. While only one initiator node 112, one first participant node 114, and one second participant node 116 are shown in the example messaging flow 500 for reasons of brevity and clarity, it is to be appreciated and understood that similar messaging flows to those illustrated by the example messaging flow 500 also can be used for a transaction involving multiple initiator nodes, multiple first (e.g., primary) participant nodes, and/or multiple second (e.g., buddy) participant nodes. For instance, a similar messaging flow to that shown by the example messaging flow 500 can be utilized (e.g., by the system 100, or system 200, . . . ) for a transaction involving multiple first participant nodes, each of which potentially being associated with one or multiple second participant nodes, without departing from the scope of the disclosed subject matter.

In an aspect, the initiator node 112 or another component of the system (e.g., system 100, or system 200, . . . ) can determine or identify one or more second participant nodes, such as second participant node 116, and can assign the one or more second participant nodes (e.g., 116) to a given first participant node 114 prior to initiation of the messaging flow 500 via a static buddy nomination scheme and/or by other desired means or mechanisms. For instance, each node (e.g., storage node) in the system can have a respective (e.g., unique) device identifier (devid) X, wherein X can be distinct identification information or number that can identify the associated node. In some embodiments, for each node (e.g., first participant node 114) identified by its respective device identifier X, the initiator node 112 or the other component of the system can nominate a node (e.g., second participant node 116) having the next highest device identifier (e.g., wrapped upwards) as a buddy for the node (e.g., first participant node 114) with regard to a transaction. In other embodiments, the disclosed subject matter (e.g., the initiator node 112) can utilize another desired scheme(s) to determine and nominate a node (e.g., second participant node 116) as a buddy for a primary node (e.g., first participant node 114) with regard to a transaction. In a further aspect, the initiator node 112 can fetch the generation indicator for each first participant node 114, for example, as described above with respect to FIGS. 2-4, from GMP group information and/or other suitable information prior to initiation of (or subsequent to initiation of) the messaging flow 500.

The example messaging flow 500 can present example transaction messages relating to a transaction, and can include, in part, certain transaction messages relating to address mirroring, as more fully described herein. The respective transaction messages can be communicated between the initiator node 112 and the first participant node 114 and/or second participant node 116, such as described herein with regard to the example messaging flow 500.

As shown at reference numeral 502 (e.g., a first time or temporal point, or first logical point) of the example messaging flow 500, the initiator node 112 can generate and send transaction start (txn_start) messages to the first participant node(s) 114 and the second participant node(s) 116, respectively. In an aspect, the initiator node 112 can send the txn_start messages to the first participant node(s) 114 and the second participant node(s) 116 in parallel, for example, as a common message that can be directed toward both sets of participants (e.g., first participant node(s) 114, second participant node(s) 116), or in separate messages. In another aspect, the txn_start messages, sent by the initiator node 112 at reference numeral 502, can comprise the generation information (e.g. generation indicator or number) associated with the first journal 122 (e.g., with regard to the transaction), for example, as obtained by the initiator node 112 prior to the reference point 502 of the example messaging flow 500.

If the generation information sent by the initiator node 112 with the txn_start message at reference point 502 differs from the generation information associated with one or more of the participant nodes (e.g., 114 and/or 116), the transaction can be aborted (e.g., by the initiator node 112) pending resolution of the differences in the generation information. For example, if the generation indicator or number sent by the initiator node 112 is lower than the generation indicator or number of one or more of the participant nodes (e.g., 114 and/or 116), the participant node(s) (e.g., 114 and/or 116), which can be associated with a higher generation indicator or number, can return a restartable error message to the initiator node 112 or other desired component of the system (e.g., system 100, or system 200, . . . ). This difference in generation indicator or number can occur, for example, due to a group change racing with the transaction. As a result of such difference in the generation indicator or number, and in response to the restartable error message, the initiator node 112 can restart or reinitiate the transaction after fetching updated GMP group change information (e.g., via operation restart (OPRESTART) logic). Alternatively, if the generation indicator or number sent by the initiator node 112 is higher than the generation indicator or number associated with the participant node(s) (e.g., 114 and/or 116), it can be assumed (e.g., the initiator node 112 can assume or determine) that the first participant node 114 is in the process of incrementing its generation indicator or number. As a result, the txn_start messages can be serialized (e.g., by the initiator node 112) with the generation increment operation.

As presented at reference numeral 504 (e.g., a second time or temporal point, or second logical point) of the example messaging flow 500, the initiator node 112 can send one or more write or delta messages (e.g., file system (FS) writes) to the first participant node 114. The one or more write or delta messages can comprise a write block message (write block) to write data to a block, a write delta message (write_delta) relating to a write involving a delta or change in or associated with data (e.g., an incremental change in data or to a data field), a write elide message (write_elide) to delete or overwrite data in a data storage block at a block address(es), a write node (e.g., inode) message (write_inode), or logical inodes super write message (lin_super_write), wherein lin (or LIN) can refer to a logical inode. A write delta message, for example, can comprise information, such as transaction information (e.g., transaction identifier), a block address(es) to be modified, offset information relating to an offset in the data storage block (e.g., LIN), and/or other desired information. A LIN can be a unique identifier that can refer to or identify a data storage structure (e.g., a data storage location or on-disk data structure) for a file or a directory.

As presented at reference numeral 506 (e.g., a third time or temporal point, or third logical point) of the example messaging flow 500, for each write or delta message sent by the initiator node 112 to the first participant node 114, the initiator node 112 also can send a corresponding message with a corresponding payload to the second participant node 116, wherein the corresponding payload can comprise the recovery information relating to the transactional file system update (e.g., state of the transaction, first set of block addresses (e.g., in the data store 120) involved in the transaction, error correction-related information, and/or second set of mirror block addresses (e.g., in the data store 128 of the third participant node 118)) and/or other desired information, such as more fully described herein. For instance, this corresponding message, sent to the second participant node 116, can be a particular RBM message that can be utilized to send the corresponding payload to the second participant node 116.

After sending all of the intended writes (e.g., write messages) to the first participant node 114 and associated corresponding messages to the second participant node 116, the initiator node 112 can generate transaction prepare (txn_prepare) messages, and can send the txn_prepare messages to the first participant node 114 and second participant node 116 to facilitate preparing for execution of the transaction at the first participant node 114, as backed up by the second participant node 116. In some embodiments, following the transfer of the write and/or delta messages to the first participant node 114 and the transfer of the corresponding messages to the second participant node 116, subsequent resolution of the transaction can proceed per 2PCv2 protocol. For instance, as indicated at reference numeral 508 (e.g., a fourth time or temporal point, or fourth logical point) of the example messaging flow 500, the initiator node 112 can send (e.g., communicate or transfer) txn_prepare messages to the first participant node 114 and second participant node 116.

In response to receiving the txn_prepare messages, each of the first participant node 114 and second participant node 116 can prepare for execution of the transaction based at least in part on the respective information (e.g., write or delta messages; corresponding messages) received by the first participant node 114 and second participant node 116. As indicated at reference numerals 510 and 512 (e.g., fifth and sixth times or temporal points, or fifth and sixth logical points) of the example messaging flow 500, in response to receiving the txn_prepare messages and after respectively preparing for execution of the transaction, the first participant node 114 and second participant node 116 each can generate transaction prepared (txn_prepared) messages and can send the respective txn_prepared messages to the initiator node 112.

In response to receiving the txn_prepared messages from the first participant node 114 and second participant node 116, as indicated at reference numeral 514 (e.g., seventh time or temporal point, or seventh logical point) of the example messaging flow 500, the initiator node 112 can generate transaction commit (txn_commit) messages and can send the txn_commit messages to the first participant node 114 and second participant node 116. The txn_commit message to the first participant node 114 can instruct the first participant node 114 that the transactional file system update (e.g., the write or delta messages of the transactional file system update) can be committed to the first journal 122, and the txn_commit message to the second participant node 116 can instruct the second participant node 116 that the recovery information and/or other information associated with the transactional file system update can be committed to the second journal 126.

In response to receiving txn_commit message, the first participant node 114 can commit the transactional file system update (e.g., the write or delta messages of the transactional file system update) to the first journal 122. After successful commitment of the transactional file system update to the first journal 122, the first participant node 114 can generate a transaction committed (txn_committed) message. Also, in response to receiving its txn_commit message, the second participant node 116 can commit the recovery information and/or other information associated with the transactional file system update to the second journal 126.

After successful commitment of the recovery information and/or other information to the second journal 126, the second participant node 116 can generate a txn_committed message, which can be the same as or similar to (e.g., can correspond to) the txn_committed message generated and sent by the first participant node 114.

In response to successfully committing the transactional file system update to the first journal 120, as indicated at reference numeral 516 (e.g., eighth time or temporal point, or eighth logical point) of the example messaging flow 500, the first participant node 114 can send its txn_committed message to the initiator node 112 to notify the initiator node 112 that the first participant node 114 has successfully committed the transactional file system update to the first journal 122. Similarly, in response to successfully committing the recovery information and/or other information to the second journal 126, as indicated at reference numeral 518 (e.g., ninth time or temporal point, or ninth logical point) of the example messaging flow 500, the second participant node 116 can send its txn_committed message to the initiator node 112 to notify the initiator node 112 that the second participant node 116 has successfully committed the recovery information and/or other information to the second journal 126.

As indicated at reference numeral 520 (e.g., tenth time or temporal point, or tenth logical point) of the example messaging flow 500, in response to receiving the respective txn_committed messages from the first participant node 114 and second participant node 116, the initiator node 112 can generate txn_committed messages (e.g., confirming txn_committed messages), and can send the txn_committed messages to the first participant node 114 and second participant node 116 to confirm the transaction (e.g., confirm that respective commitment to the journals 122 and 126 has been performed and is acknowledged, and/or confirm that the transaction has been committed and/or the execution of the transaction can proceed). At this point, the example messaging flow 500 can end.

Figure 6:
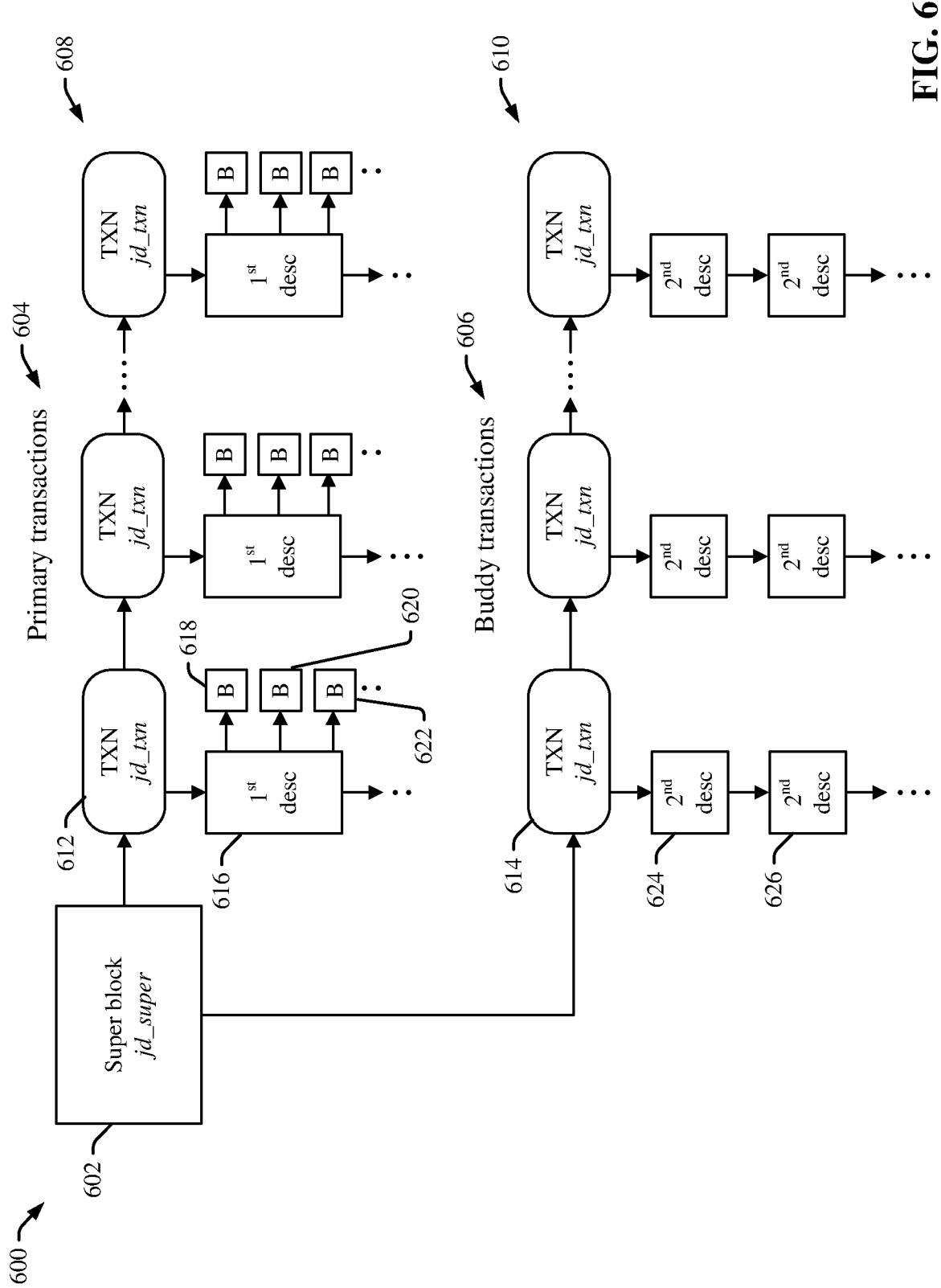
FIG. 6 illustrates a block diagram of an example journal structures that can employ address mirroring and can be used for storing respective file system journals in a first participant node and a second participant node, in accordance with various aspects and embodiments of the disclosed subject matter.

Referring to FIG. 6 (along with FIGS. 1, 2, and 5), FIG. 6 illustrates a block diagram of an example journal structures 600 that can employ address mirroring and can be used for storing respective file system journals in a first (e.g., primary) participant node and a second (e.g., buddy) participant node, in accordance with various aspects and embodiments of the disclosed subject matter. In some embodiments, with regard to the example journal structures 600, a super block 602 (jd_super) can be utilized, wherein the super block 602 can comprise identifying information for the node(s) and/or drives(s) (e.g., data store(s) or data storage drive(s)) that correspond to the journal device. Respective transactions (TXNs) associated with the journal device can be structured as respective linked lists of transaction blocks (jd_txn) that can refer back to the super block 602.

As shown in example journal structures 600, a journal device can comprise both primary transactions 604 and secondary or buddy transactions 606. For instance, a physical journal device, can have a primary participant node of a transaction and a buddy participant node, of a different primary participant node, for the same transaction. In an aspect, the primary journal structure 608 of the primary (e.g., first) journal and the buddy journal structure 610 of the buddy (e.g., second) journal can be logically separated, for example, as shown in example journal structures 600, while still utilizing the same on-disk formats. For reasons of brevity and clarity, the journal structure of a third participant node (e.g., node 118) is not shown in FIG. 6. In some embodiments, if and when a third participant node (e.g., node 118) is employed as part of executing the transaction associated with the first (e.g., primary) participant node and a second (e.g., buddy) participant node in order to facilitate desired data redundancy with regard to the transaction, the journal structure of the journal of or associated with the third participant node can be similar (e.g., similar in structure) to the primary journal structure 608 of the primary journal, and the journal of or associated with the third participant node can comprise at least some of the information (e.g., transactional file system update information) that is in the primary journal of or associated with the first (e.g., primary) participant node.

The primary journal structure 608 and the buddy journal structure 610 each can comprise respective jd_txn blocks, such as, for example, jd_txn block 612 and jd_txn block 614, for the respective primary transactions 604 and buddy transactions 606. The respective jd_txn blocks (e.g., jd_txn block 612 and jd_txn block 614) of the primary journal structure 608 and the buddy journal structure 610 can comprise respective metadata corresponding to respective associated transactions, wherein the respective metadata can comprise, for example, a state of a transaction, the participant nodes (e.g., primary or first participant node, buddy or second participant node, and/or initiator node) involved in the transaction, etc.

As also shown in the example journal structures 600, the jd_txn blocks (e.g., jd_txn block 612) of the primary journal structure 608 can be associated with (e.g., can link to) one or more first (or primary) journal descriptor blocks ($1^{st}$ desc), such as first journal descriptor block 616, wherein each first journal descriptor block (e.g., 616) of the primary journal structure 608 can be associated with (e.g., can be linked to or can include pointers to) respective blocks (B), such as blocks 618, 620, and 622, of the drives (e.g., respective data storage blocks of the respective data stores or data storage drives) associated with that transaction. The first journal descriptor block (e.g., 616) can comprise, for example, the transactional file system update, first size information that can indicate a first size of the first journal descriptor block, a first flag that can indicate a first purpose of the first journal descriptor block, and/or other desired information, wherein the first flag can indicate that the transaction associated with that first journal descriptor block is a primary transaction.

Figure 7:
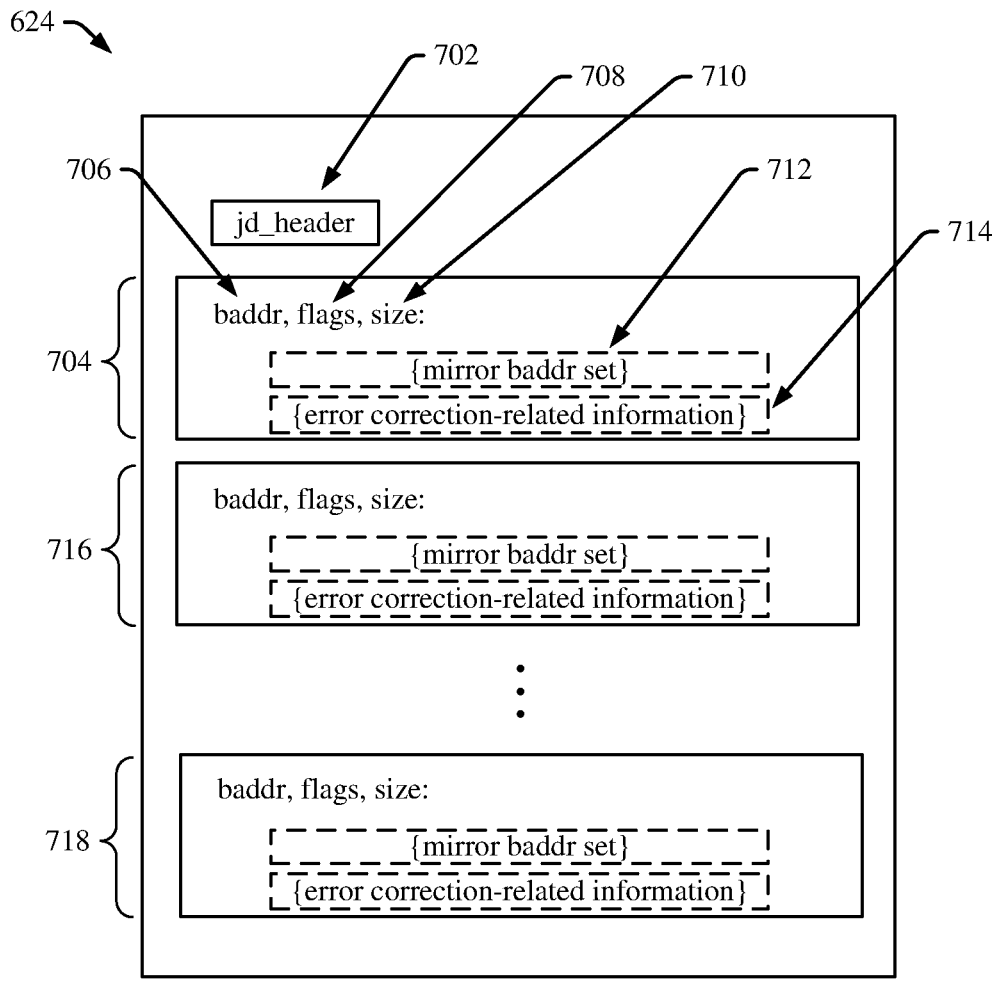
FIG. 7 depicts a block diagram of an example second (or buddy) journal descriptor block that can employ address mirroring and can be a data structure that can be used for storing recovery information relating to a transactional file system update in a second (e.g., buddy) file system journal in or associated with a second participant node, in accordance with various aspects and embodiments of the disclosed subject matter.

As further shown in the example journal structures 600, the jd_txn blocks (e.g., jd_txn block 614) of the buddy journal structure 610 can be associated with (e.g., can link to) one or more second (or buddy) journal descriptor blocks ($2^{nd}$ desc), such as second journal descriptor blocks 624 and 626, wherein each second journal descriptor block (e.g., 624 or 626) of the buddy journal structure 610 can comprise respective recovery information and/or other desired information associated with that transaction. Referring briefly to FIG. 7 (along with FIGS. 1, 2, 5, and 6), FIG. 7 depicts a block diagram of an example second (or buddy) journal descriptor block 624 that can employ address mirroring and can be a data structure that can be used for storing recovery information relating to a transactional file system update in a second (e.g., buddy) file system journal in or associated with a second participant node, in accordance with various aspects and embodiments of the disclosed subject matter. The second journal descriptor block 624 can utilize a unique structure (e.g., an on-disk or on-journal structure) that can be different from, but can be modeled after and can use a same or similar journal format (e.g., on-disk or on-journal format) as, the first journal descriptor block 616, wherein the second journal descriptor block 624, with its unique structure, can store mirror information (e.g., address mirror information and/or other recovery information, such as described herein) about the file system metadata and file system data updates. The second journal descriptor block 624 can store block addresses of the blocks in the data store 120 of the first participant node 114 being updated by the transaction. In some embodiments, the second journal descriptor block 624 can store the block addresses of the mirrors of the file system blocks associated with the transaction (e.g., mirror block addresses in the data store 128 of the third participant node 118 that also are being updated to store the write or update data associated with the transactional file system update). In certain embodiments, additionally or alternatively (e.g., in addition to or as an alternative to including the mirror block addresses in the second journal descriptor block 624), the second journal descriptor block 624 can store error correction-related information relating to error correction information associated with the data being written to or updated in the set of block addresses in the data store 120 of the first participant node 114, wherein the error correction-related information can comprise a data storage location identifier(s) that can identify a data storage location(s) in a node (e.g., in the data store 128 of the third participant node 118 or another data store of another node) where the error correction information is stored. The structure of the second journal descriptor block 624 can be extensible, and also can store the size of the structure of the second journal descriptor block 624 and a flag that can identify the purpose of the second journal descriptor block 624, as more fully described herein.

The journal descriptor block generator component 104 can generate the second journal descriptor block 624 that comprises header information 702 (jd_header), which can comprise or store metadata relating to a transaction with regard to which the second journal (e.g., 126) and associated second participant node (e.g., 116) are participating as a backup to the first journal (e.g., 122) and associated first participant node (e.g., 114) to facilitate recovery of the contents of the first journal if and when there is a journal failure or such contents of the first journal are otherwise inaccessible, as more fully described herein. In some embodiments, the metadata can comprise the generation indicator associated with the first journal 122 and/or state information relating to a state of the transaction.

The journal descriptor block generator component 104 can generate the second journal descriptor block 624 to comprise or store certain recovery information 704 relating to the transaction, wherein the certain recovery information can comprise, for example, a first set of block addresses (baddrs) 706 in the data store 120 of the first participant node 114 that is involved in the transaction, a second flag 708 and/or another desired flag(s) (flags) where the second flag can indicate a second purpose (e.g., a buddy transaction associated with a primary transaction, and/or for journal recovery of the first journal 120 (if and when desired)) of the second journal descriptor block 624, second size information 710 (size) that can indicate a second size of the second journal descriptor block 624, a second set of mirror block addresses 712 (mirror baddr set) that can mirror the first set of block addresses 706 and can be located in the data store 128 of the third participant node 118, . . . ), and/or error correction-related information 714 relating to error correction information associated with the data being written to or updated in the first set of block addresses 706. In some embodiments, the second journal descriptor block 624 can include more than one subset of recovery information relating to respective transactional file system updates, such as, for example, subset of recovery information 716 and (up through) subset of recovery information 718 associated with respective transactional file system updates, in addition to the certain (e.g., subset of) recovery information 704 relating to the transactional file system update.

In accordance with various embodiments, a jd_txn block (e.g., jd_txn block 614) of the buddy journal structure 610 or the second journal descriptor block 624 can store the generation indicator associated with the first journal 122 and/or the transaction, the state information relating to the state of the transaction, and/or a node identifier that can identify the first participant node 114 associated with the transaction.

With further regard to FIG. 6, in certain aspects, the journal descriptor block generator component 104 can generate (e.g., create) the first journal descriptor blocks (e.g., 616) and second journal descriptor blocks (e.g., 624) when the second participant node 116 (e.g., buddy participant) processes RBM messages from the initiator node 112. Before responding to a txn_prepare message received from the initiator node 112 by sending a txn_prepared message to the initiator node 112 (e.g., as shown at reference numerals 508 and 512 in FIG. 5), the second participant node 116 can ensure one or more of the following:

1) the jd_txn block (e.g., 614) and second journal descriptor blocks (e.g., 624, 626, . . . ) are written to the second journal 126;
2) the second journal descriptor blocks (e.g., 624, 626, . . . ) are linked with the corresponding jd_txn block (e.g., 614); and/or
3) the jd_txn block (e.g., 614) is linked to the global transaction list of the second journal 126.

Figure 8:
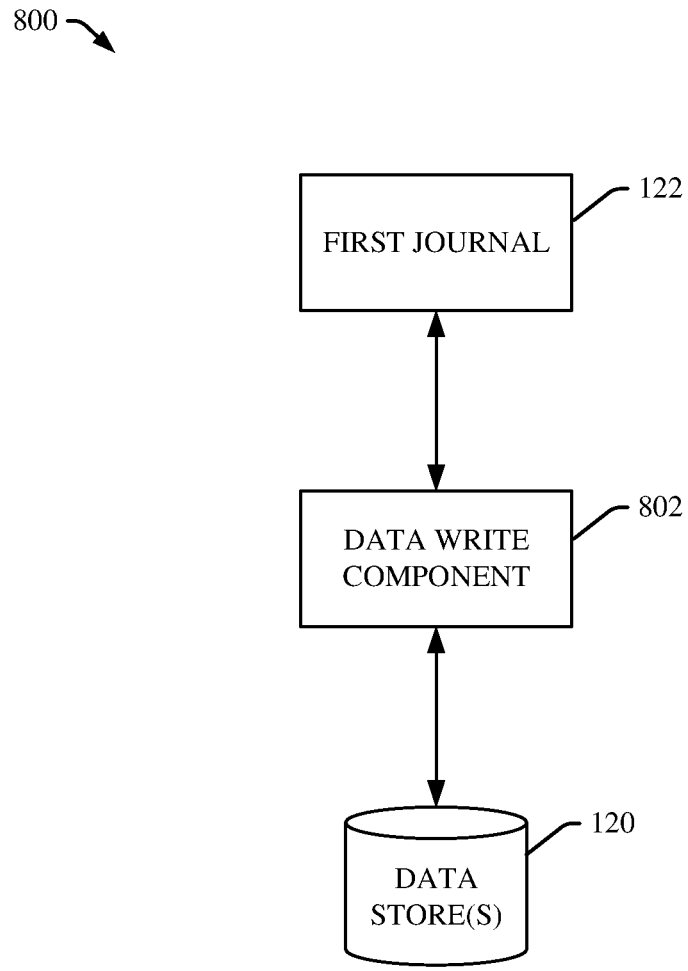
FIG. 8 presents a block diagram of an example system that can facilitate performing a write operation associated with a transaction based on information stored in a file system journal (e.g., first or primary journal), in accordance with various aspects and embodiments of the disclosed subject matter.

Turning to FIG. 8 (along with FIGS. 1 and 2), FIG. 8 presents a block diagram of an example system 800 that can facilitate performing a write operation associated with a transaction based on information stored in a file system journal (e.g., first journal 122), in accordance with various aspects and embodiments of the disclosed subject matter. Repetitive description of like elements employed in other embodiments described herein is omitted for brevity. The system 800 can comprise a data write component 802 that can facilitate writing respective transactional file system updates, for example, primary transactions as present (e.g., stored) in the first journal 122 as structured and described herein, to one or more data stores, such as data store 120 (e.g., data storage disk(s)) of an associated first participant node (e.g., first participant node 114). In some embodiments, the data write component 802 can facilitate writing transaction data to the one or more data stores (e.g., data store 120), in response to respective transactional file system updates being successfully committed to the first journal 122, and in response to the respective recovery information associated with the respective file system updates being successfully committed to the second journal 126, for example, as more fully described herein (e.g., according to the process described with regard to FIG. 5). In an aspect, the data write component 802 can facilitate flushing one or more blocks (e.g., data storage blocks) involved in a given transaction as part of writing the related transactional file system updates to the one or more data stores (e.g., data store 120).

In some embodiments, if and when a third participant node (e.g., node 118) is employed as part of executing the transaction associated with the first participant node 114 and second (e.g., buddy) participant node 116 in order to facilitate desired data redundancy with regard to the transaction, in response to the respective transactional file system updates being successfully committed to the first journal 122, and in response to the respective recovery information associated with the respective file system updates being successfully committed to the second journal 126, a data write component (not shown) associated with the third participant node 118 can facilitate writing transaction data, including the data of the transactional file system update associated with the first participant node 114, to the one or more data stores (e.g., data store 128) of the third participant node 118. The data write component associated with the third participant node 118 can facilitate flushing one or more blocks involved in a given transaction as part of writing the related transactional file system updates (e.g., the data of the transactional file system update associated with the first participant node 114) to the one or more data stores (e.g., data store 128) of the third participant node 118.

Figure 9:
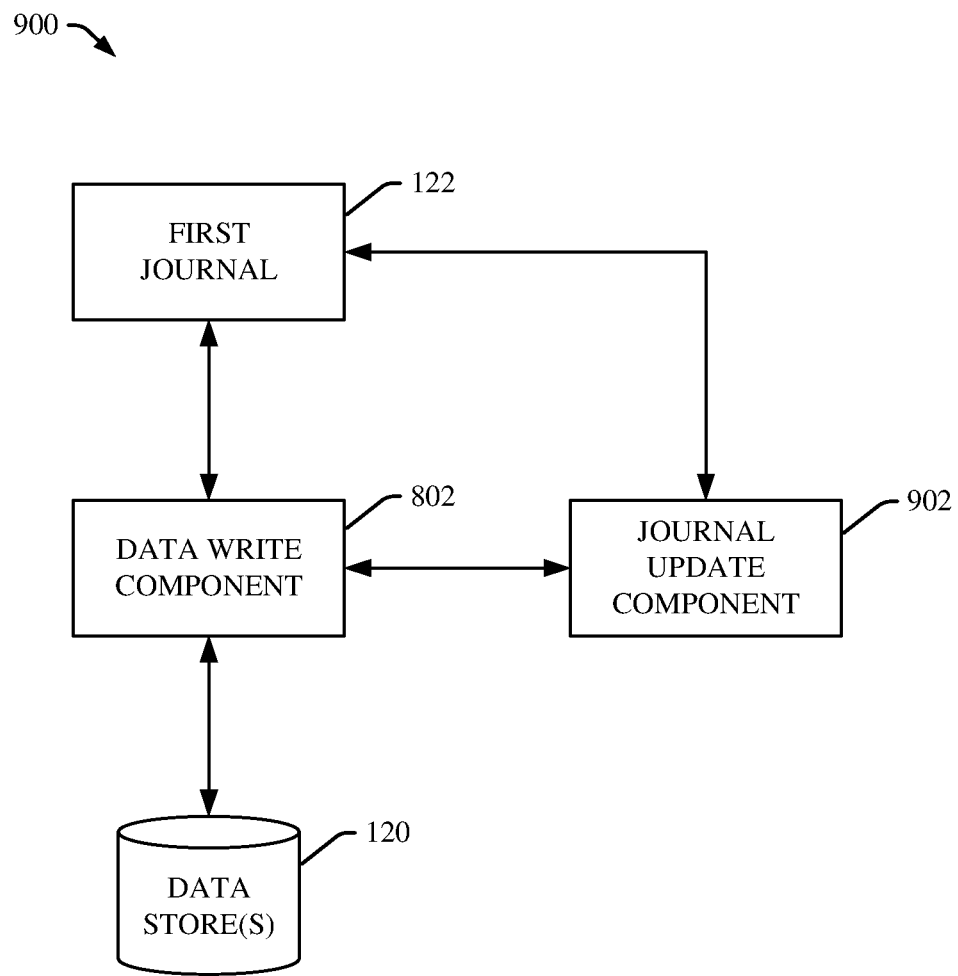
FIG. 9 depicts a block diagram of an example system that can facilitate removing transactional file system updates from a primary file system journal (e.g., first journal), in accordance with various aspects and embodiments of the disclosed subject matter.

Referring briefly to FIG. 9 (along with FIGS. 1, 2, and 8), FIG. 9 depicts a block diagram of an example system 900 that can facilitate removing transactional file system updates from a primary file system journal (e.g., first journal 122), in accordance with various aspects and embodiments of the disclosed subject matter. The system 900 can comprise the data write component 802, first journal 122, which can be part of or associated with the first participant node 114, and one or more data stores, such as data store 120 of or associated with the first participant node 114. The system 900 can comprise a journal update component 902 that can be utilized to remove one or more transactional file system updates from the first journal 122, wherein the transactional file system updates can correspond to one or more transactions that have been successfully written to the one or more data stores (e.g., data store 118), as more fully described herein. For instance, in response to the one or more transactional file system updates being successfully written to the one or more data stores, the journal update component 902 can update the first journal 122 to remove (e.g., delete or erase) information relating to the one or more transactional file system updates from the first journal 122.

If and when the third participant node 118 (e.g., as depicted in FIG. 1) is associated with a transaction, a journal update component associated with the third participant node 118 can perform a similar process to update the third journal 130 to remove (e.g., delete or erase) information relating to the one or more transactional file system updates from the third journal 130, in response to one or more transactional file system updates being successfully written to one or more data stores (e.g., data store 128) of the third participant node 118.

Figure 10:
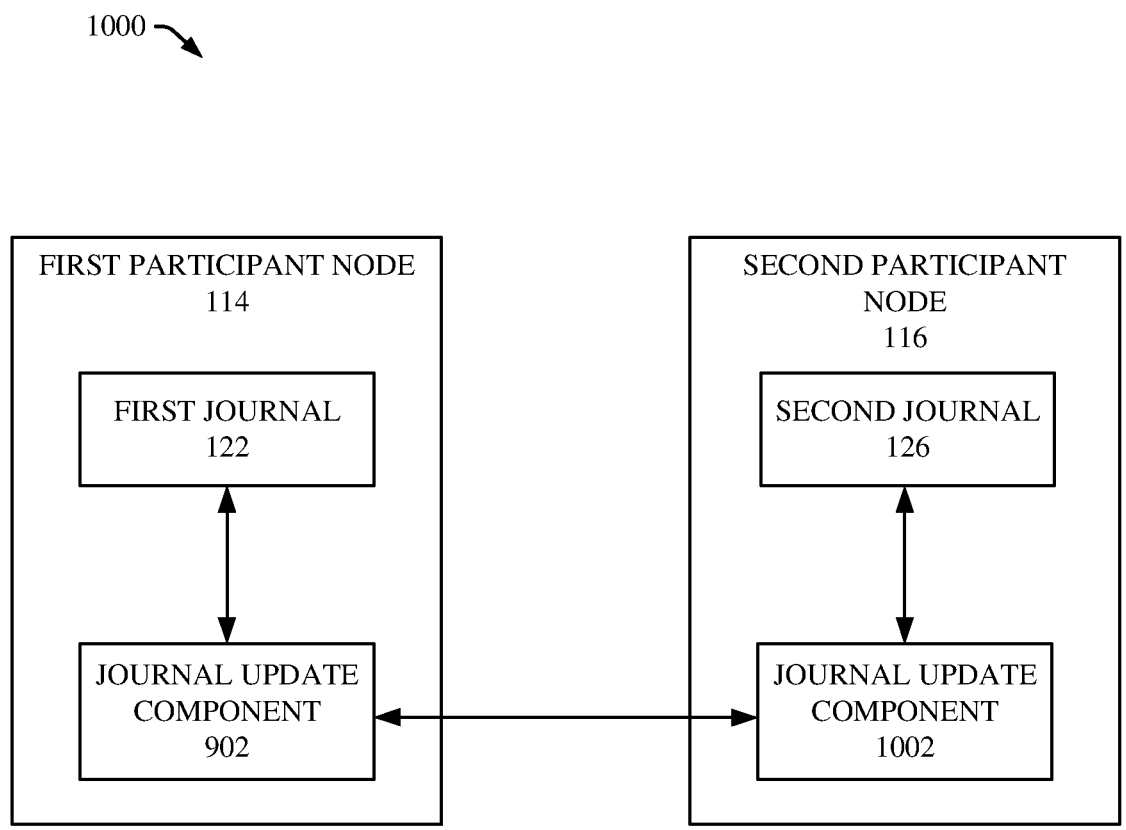
FIG. 10 illustrates a block diagram of an example system that can facilitate removing recovery information and/or other information from a buddy file system journal (e.g., second journal), in accordance with various aspects and embodiments of the disclosed subject matter.

Referring briefly to FIG. 10 (along with FIGS. 1, 2, 8, and 9), FIG. 10 illustrates a block diagram of an example system 1000 that can facilitate removing recovery information and/or other information from a buddy file system journal (e.g., second journal 126), in accordance with various aspects and embodiments of the disclosed subject matter. The system 1000 can comprise the first participant node 114 and the second participant node 116. The first participant node 114 can comprise the first journal 122 and the journal update component 902. The second participant node 116 can comprise the second journal 126 and a journal update component 1002. For reasons of brevity and clarity, the third participant node 118 is not shown in FIG. 10.

In some embodiments, in response to successfully writing the one or more transactional file system updates to the one or more data stores (e.g., data store 120) associated with the first participant node 114 (e.g., first computing node), the journal update component 902 associated with the first participant node 114 can facilitate the removal of the recovery information and/or other information relating to the one or more transactional file system updates from the second journal 126 associated with the second participant node 116, in addition to the removal of the one or more transactional file system updates corresponding to the transaction(s) from the first journal 122 of or associated with the first participant node 114. For instance, in response to such successfully writing to the one or more data stores (e.g., data store 120) associated with the first participant node 114, the journal update component 902 of the first participant node 114 can communicate a journal clear message or other similar message to the journal update component 1002 of the second participant node 116. In response to receiving the journal clear message from the journal update component 902, the journal update component 1002 can clear the portion (e.g., the storage locations) of the second journal 126 where the recovery information and/or other information relating to the one or more transactional file system updates were stored. For instance, the journal update component 1002 can remove (e.g., delete, discard, erase, or otherwise remove) or facilitate removing the recovery information and/or other information relating to the one or more transactional file system updates from the second journal 126.

For instance, in some embodiments, after flushing all of the blocks involved in a transaction, the first participant node 114, e.g., via the journal update component 902, can communicate the associated transaction identifier relating to the transaction to the second participant node 116 (e.g., using an RBM message, which can be a journal clear and/or update message) for garbage collection. As stated herein, in response to receiving the journal clear or update message, which can inform the second participant node 116 about the transaction unlink, the journal update component 1002 of the second participant node 116 can free (e.g., can discard, release, or delete) the jd_txn block and any second journal descriptor blocks associated with the transaction in the second journal 126 when (e.g., in response to or in connection with) the transaction is being unlinked on the first participant node 114, for example, due to all of the transactional file system updates associated with the transaction being flushed to the data store(s) 120 at the first participant node 114. In certain embodiments, the journal clear message can be or can comprise, for example, an update message, since any RBM error associated with the message can or may result in a split (e.g., GMP split).

Figure 11:
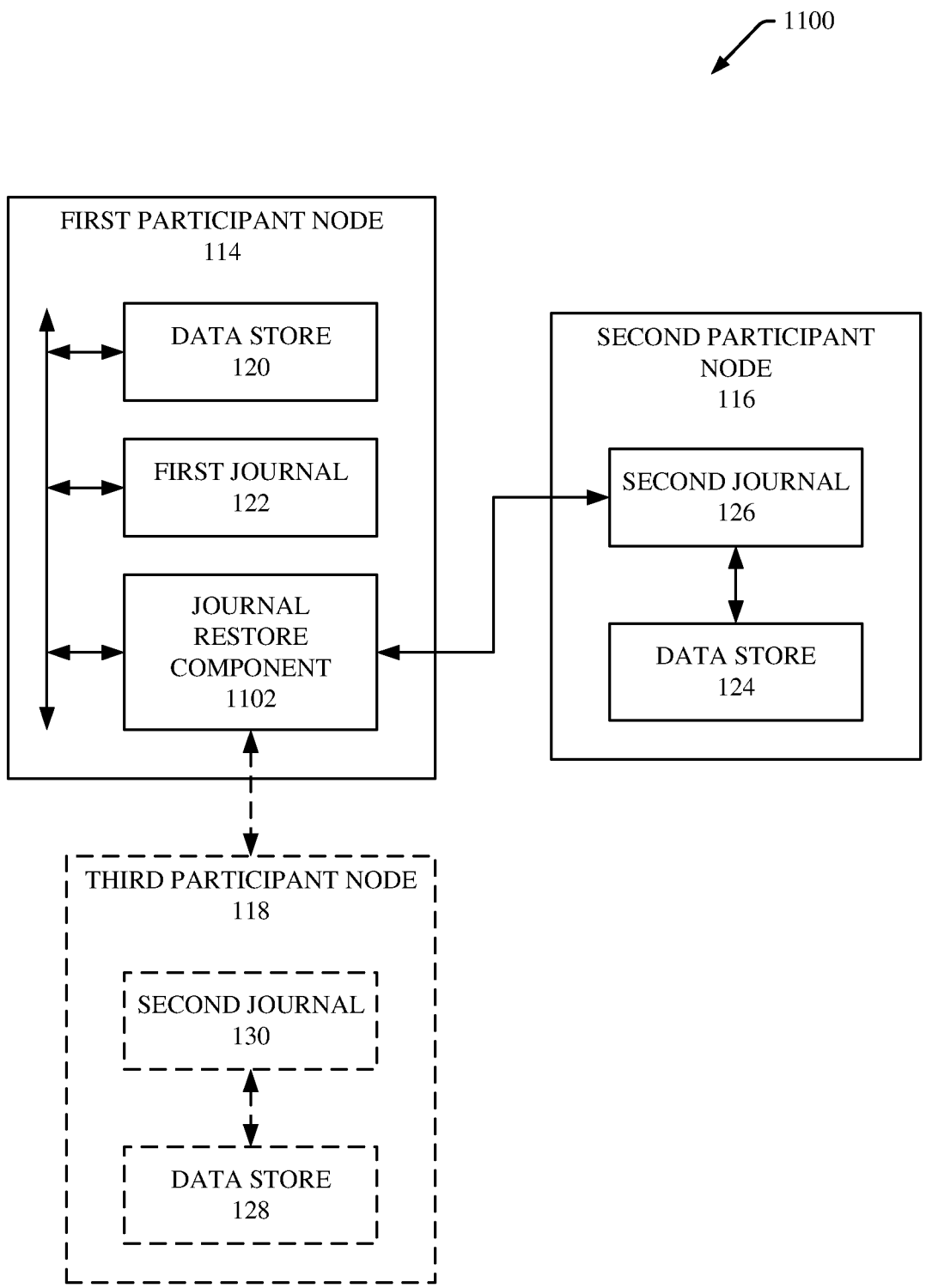
FIG. 11 illustrates a block diagram of a system that can facilitate restoring information relating to a transactional file system update to a primary (e.g., first) file system journal from recovery information, comprising mirrored address information, stored in a buddy (e.g., second) file system journal, in accordance with various aspects and embodiments of the disclosed subject matter.

Turning to FIG. 11 (along with FIGS. 1, 2, 6, 8, 9, and 10), FIG. 11 illustrates a block diagram of a system 1100 that can facilitate restoring information relating to a transactional file system update to a primary (e.g., first) file system journal from recovery information, comprising mirrored address information, stored in a buddy (e.g., second) file system journal, in accordance with various aspects and embodiments of the disclosed subject matter. Repetitive description of like elements employed in other embodiments described herein is omitted for brevity. The system 1100 can comprise the first participant node 114, which can comprise the data store 120 and also can comprise or be associated with the first journal 122, and the second participant node 116, which can comprise the data store 124 and also can comprise or be associated with the second journal 126. In some embodiments, the system 1100 also can comprise a third participant node 118, which can include the data store 128 and can include or be associated with the third journal 130.

In some embodiments, the first participant node 114 can comprise a journal restore component 1102 (e.g., a restoration component) that can restore transactional file system updates at the first journal 122 for the first participant node 114 based at least in part on (e.g., using) the recovery information as transferred (e.g., mirrored) to the second journal 126 of or associated with the second participant node 116, in response to determining that those updates have become lost or otherwise inaccessible, e.g., due to a failure of the first journal 122 and/or first participant node 114.

In certain embodiments, in the event of a journal (or node) failure of the first journal 122 and/or the first participant node 114 being detected by the first participant node 114 or other component (e.g., initiator node 112 or second participant node 116), the journal restore component 1102 can recover the lost or inaccessible journal contents (e.g., lost transactional file system updates) of the first journal 122 based at least in part on the recovery information stored in the second journal 126 on or associated with the second participating node 116. For instance, the journal restore component 1102 can obtain the recovery information (e.g., the state information relating to the state of the transaction, the first set of block addresses involved in the transaction, error correction-related information, and/or the second set of mirror block addresses associated with the third participant node 118, . . . ) from the second journal 126, and can use the recovery information to rebuild the lost or inaccessible contents of the first journal 122, which can thereby allow forward progress on (e.g., desired execution and completion of) any unresolved transactions, including the reconstruction of the corresponding transactional file system updates that were lost or otherwise inaccessible. In some aspects, the journal restore component 1102 can verify a generation number and/or other generation indicator (e.g., a generation indicator 402 as described herein with regard to FIG. 4) associated with the second journal 126 of or associated with the second participant node 116 against the generation number and/or other generation indicator stored in the first participant node 114, for example, as stored in the NSB of the first participant node 114, to facilitate ensuring the generation number and/or other generation indicator associated with the second journal 126 is the same as the generation number and/or other generation indicator associated with the first journal 122. The journal restore component 1102 can perform such comparison of generation numbers and/or other generation indicators, for example, to detect when a generation number and/or other generation indicator associated with the second journal 126 is stale or otherwise invalid in relation to the generation number and/or other generation indicator associated with the first journal 122, and enable or facilitate enabling the journal restore component 1102 to desirably handle (e.g., manage) journal restoration even when a stale secondary copy of recovery information exists in a second participant node.

While not shown in FIG. 11, in certain embodiments, the second participant node 116 also can utilize a journal restore component (e.g., same as or similar to the journal restore component 1102) to persist the respective journal data structures (e.g., primary journal data structure and/or buddy journal data structure) and rebuild the respective journal data structures across shutdown, power failure, resets, and/or other events associated with the first participant node 114 and/or second participant node 116 using similar mechanisms as the journal restore component 1102 of the first participant node 114.

In some aspects, the journal restore component 1102 and/or other suitable components or subsystems of system 1100 can (e.g., via GMP) assign a unique node, such as, for example, second participant node 116 as shown in the system 1100 (or the initiator node 112 or another component), to assume or manage responsibility for a given transaction in the case of a failover operation to address a failure or other event that results in the loss or inaccessibility of contents associated with a transaction(s) that was stored in a file system journal, such as the first journal 122, such as described herein. Such assignment of the unique node can be done, for example, to avoid conflicts between multiple nodes (e.g., multiple computing nodes, such as nodes 112, 114, 116, and/or 118) that may attempt to assume responsibility for the same transaction.

In certain embodiments, the first participant node 114, via the journal restore component 1102, can sync-back and/or read back transaction states and corresponding transactional file system updates. In some embodiments, the journal restore component 1102 can accomplish or perform such syncing-back and/or reading back transaction states and corresponding transactional file system updates by, for example, obtaining and utilizing a backup of the state of the second journal 126 (e.g., isi_save_journal) utilizing a journal save procedure and restoring the second journal 126 (e.g., restoring the state of the second journal 126) on the first participating node 114 via a modified journal restore procedure (e.g., with modifications to contents, such as recovery information, stored in the second journal 126 (e.g., isi_restore_journal)) that can desirably (e.g., correctly or appropriately) initialize the journal super block (e.g., journal super block 602, as described herein with regard to FIG. 6) to facilitate the recovery of the lost or inaccessible contents of the first journal 122. Additionally or alternatively, the journal restore component 1102 can accomplish or perform such syncing-back and/or reading back transaction states and corresponding transactional file system updates by syncing back on-wire, for example, using RBM messages.

In accordance with various embodiments, the journal restore component 1102 can perform a relatively less active recovery of lost or inaccessible contents of the first journal 122 or can perform a relatively more active (e.g., proactive) recovery of lost or inaccessible contents of the first journal 122. For instance, the journal restore component 1102 can analyze the recovery information obtained from the second journal 126 in relation to the lost or inaccessible contents of the first journal 122. Based at least in part on the results of such analysis of the recovery information obtained from the second journal 126 and/or the information relating to the lost or inaccessible contents of the first journal 122, the journal restore component 1102 can determine which block addresses were lost or became otherwise inaccessible with regard to the contents of the first journal 122, and can utilize the information relating to such block addresses and the recovery information relating to the lost or inaccessible block addresses to trigger and perform recovery of the lost or inaccessible block addresses of the lost or inaccessible contents of the first journal 122.

In some embodiments, with regard to the relatively less active recovery of lost or inaccessible contents of the first journal 122, in response to detecting that there is a lost or inaccessible transactional file system update, which can result in lost or inaccessible block addresses relating thereto, the journal restore component 1102 can treat the lost or inaccessible block addresses (e.g., the first set of block addresses, or a portion thereof) as block addresses in an ECC list, which can be maintained on the first participant node 114 and/or can be accessed by the journal restore component 1102 (e.g., from any location where the ECC list is maintained), wherein, however, such block addresses can persist in the first journal 122 or second journal 126. Using the recovery information (e.g., the state information relating to the state of the transaction, the first set of block addresses involved in the transaction, error correction-related information, and/or the second set of mirror block addresses, . . . ) obtained from the second journal 126, the journal restore component 1102 can recover or restore the lost contents contained in the first set of block addresses associated with the transaction, and the first participant node 114 (e.g., employing the data write component 802 of FIG. 8) can write the data to the data store 120 of the first participant node 114 based at least in part on the contents obtained (e.g., read) from the first set of block addresses and/or the other recovery information.

In other embodiments, with regard to the more proactive recovery of lost or inaccessible contents of the first journal 122, in response to detecting that there is a lost or inaccessible transactional file system update, which can result in lost or inaccessible block addresses relating thereto, the journal restore component 1102 can reconstruct, recover, or restore the lost contents of the first journal 122 that relate to the transaction by reading the second set of mirror block addresses of the data store 128 of the third participant node 118 and/or based at least in part on the results of analyzing the other recovery information relating to the transaction. Alternatively or additionally, the journal restore component 1102 can recover or restore the lost contents of the first journal 122 that relate to the transaction by performing a narrow restripe job working on only a desired (e.g., suitable, appropriate, or required) set of logical inodes/logical inode: offset pair (LINs/LIN:offset pair) relating to the lost contents associated with the lost block addresses of the transaction to recover or restore such lost contents. In such instance, it is not necessary for the journal restore component 1102 to reconstruct the entire first journal 122, but rather the journal restore component 1102 can reconstruct only the portion of the contents of the first journal 122 that were lost or inaccessible.

As described herein, in some embodiments, the disclosed subject matter (e.g., the journal restore component 1102) can utilize error correction information (e.g., ECC, FEC, parity information (e.g., parity block), and/or erasure coding) associated with the transaction (e.g., write or update data of the transaction) to facilitate recovering, restoring, or reconstructing lost or inaccessible contents (e.g., lost or inaccessible write or update data, or information relating thereto) of the first journal 122. For instance, the initiator node 112 (e.g., write processing component 102 or other component of the initiator node 112) can determine or generate error correction information associated with the data (e.g., block(s) of data) based at least in part on the data and a desired error correction algorithm and/or desired error correction function, which can be applied to the data to facilitate determining or generating the error correction information, such as described herein.

For instance, in certain embodiments, for every two blocks of data, the initiator node 112 can determine, generate, and/or utilize one parity block (e.g., one block of error correction information), wherein, if one of the two data blocks is lost or corrupted, the journal restore component 1102 can utilize the parity block and the remaining block of data to reconstruct the lost or corrupted block of data. For example, the first block of data can be stored or can be intended to be stored in a first node (e.g., first participant node 114), the second block of data can be stored in another node (e.g., fourth participant node), and the parity block associated with the first and second blocks can be stored in still another node or journal (e.g., second journal 126), wherein the respective block addresses of the first and second blocks can be part of the recovery information associated with the transaction that is stored in the second journal 126 in connection with the transactional file system update, and wherein error correction-related information (e.g., LIN and offset information that can indicate the storage location (e.g., node, storage drive, and offset) where the parity block is stored) associated with the first and second blocks also can be part of the recovery information. If the first block of data was lost or corrupted in the first journal 122 (e.g., prior to storage in the data store 120 of the first participant node 114), the journal restore component 1102 can obtain the error correction-related information in the recovery information associated with the transaction and information regarding the block address of the second block of data from the second journal 126. The journal restore component 1102 can utilize the error correction-related information (e.g., LIN and offset) in the recovery information to determine the storage location of the parity block (e.g., in the data store 128 of the third participant node 118), and can read the parity block from the storage location of the node in which the parity block is stored. For example, the journal restore component 1102 can reference the LIN and offset in the LIN tree structure, and based at least in part on the mapping of the LIN tree structure, the LIN, and the offset, the journal restore component 1102 can identify or determine the physical storage location (e.g., node, storage drive, and offset) where the parity block is stored, and can read the parity block from the physical storage location. Using the second block address, the journal restore component 1102 can read the second block of data from the second block address in the other node (e.g., fourth participant node) in which the second block of data is stored. The journal restore component 1102 can determine or reconstruct the first block of data based at least in part on the second block of data and the parity block, utilizing the desired error correction algorithm and/or desired error correction function (or a corresponding error correction algorithm and/or error correction function relating thereto).

As an example, with regard to a transactional file system update involving the first journal 122 and first participant node 114 as the primary participant and the second journal 126 and second participant node 116 as the buddy participant in relation to the primary participant, the recovery information (e.g., minimal or relatively smaller portion of recovery information, as determined or generated by the journal descriptor block generator component 104) can comprise the first set of block addresses associated with the transaction, error correction-related information (e.g., LIN and offset information) relating to parity blocks (e.g., erasure coded parity blocks, which can comprise FEC or other type of error correction information) associated with the transaction, and the LIN and offset information (e.g., LIN: offset pair) relating to the file or data to be written in connection with that transaction. If, prior to a successful write of the data to the data store 120 of the first participant node 114, a portion of the contents (e.g., first block of data of a file being written or updated) stored in the first journal 122 is lost, corrupted, or otherwise inaccessible, the journal restore component 1102 can obtain the recovery information, including the error correction-related information (e.g., LIN and offset information relating to the erasure coded parity block(s)) relating to the lost, corrupted, or inaccessible portion of the contents and the LIN and offset information relating to the remaining block of data (e.g., second block of data) and/or the lost block of data. Using the respective LIN and offset information associated with the second block of data and the error correction information, the journal restore component 1102 can identify the location of and read the block of data (e.g., second block of data), and can identify the location of and read the block of error correction information (e.g., the erasure coded parity block), associated with the lost, corrupted, or inaccessible block of data (e.g., the first block of data) that was stored in the first journal 122. The journal restore component 1102 can determine or reconstruct the lost, corrupted, or inaccessible block of data (e.g., first block of data) based at least in part on the remaining block of data (e.g., the second block of data) and the error correction information associated with those two blocks of data, utilizing the desired error correction algorithm and/or desired error correction function (or the corresponding error correction algorithm and/or error correction function relating thereto).

Figure 12:
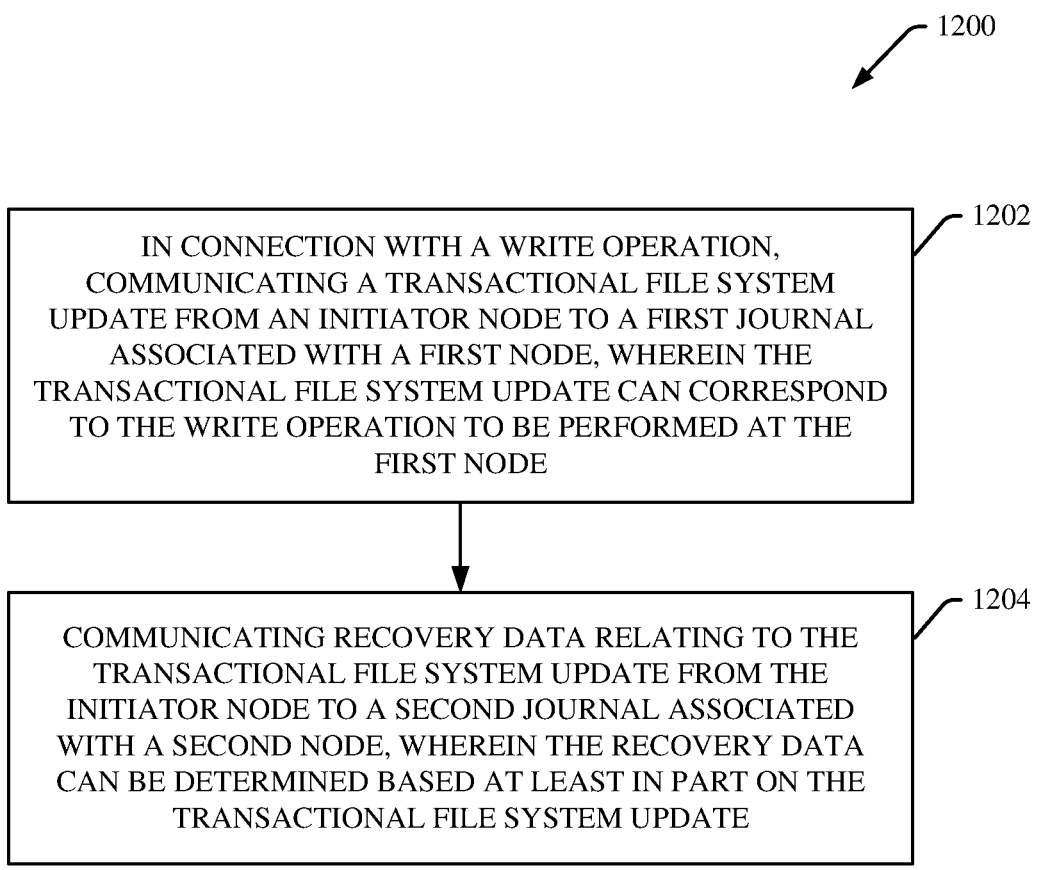
FIG. 12 depicts a flow diagram of an example method that can facilitate mirroring addresses of a file system journal to facilitate journal recovery if and when desired, in accordance with various aspects and embodiments of the disclosed subject matter.
Figure 13:
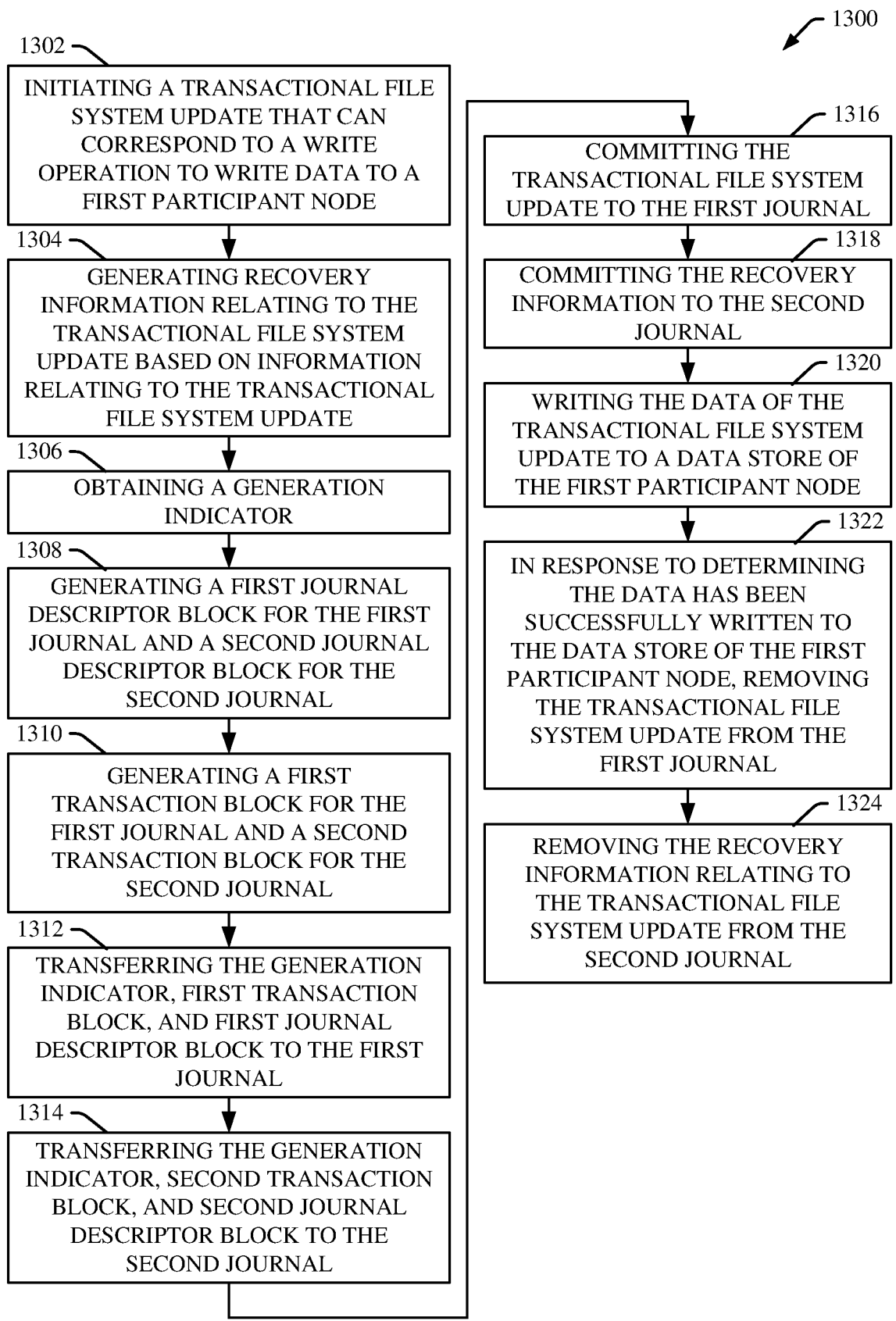
FIG. 13 illustrates a flow diagram of another example method that can facilitate mirroring addresses and/or other desired recovery information of a file system journal to facilitate journal recovery if and when desired, in accordance with various aspects and embodiments of the disclosed subject matter.
Figure 14:
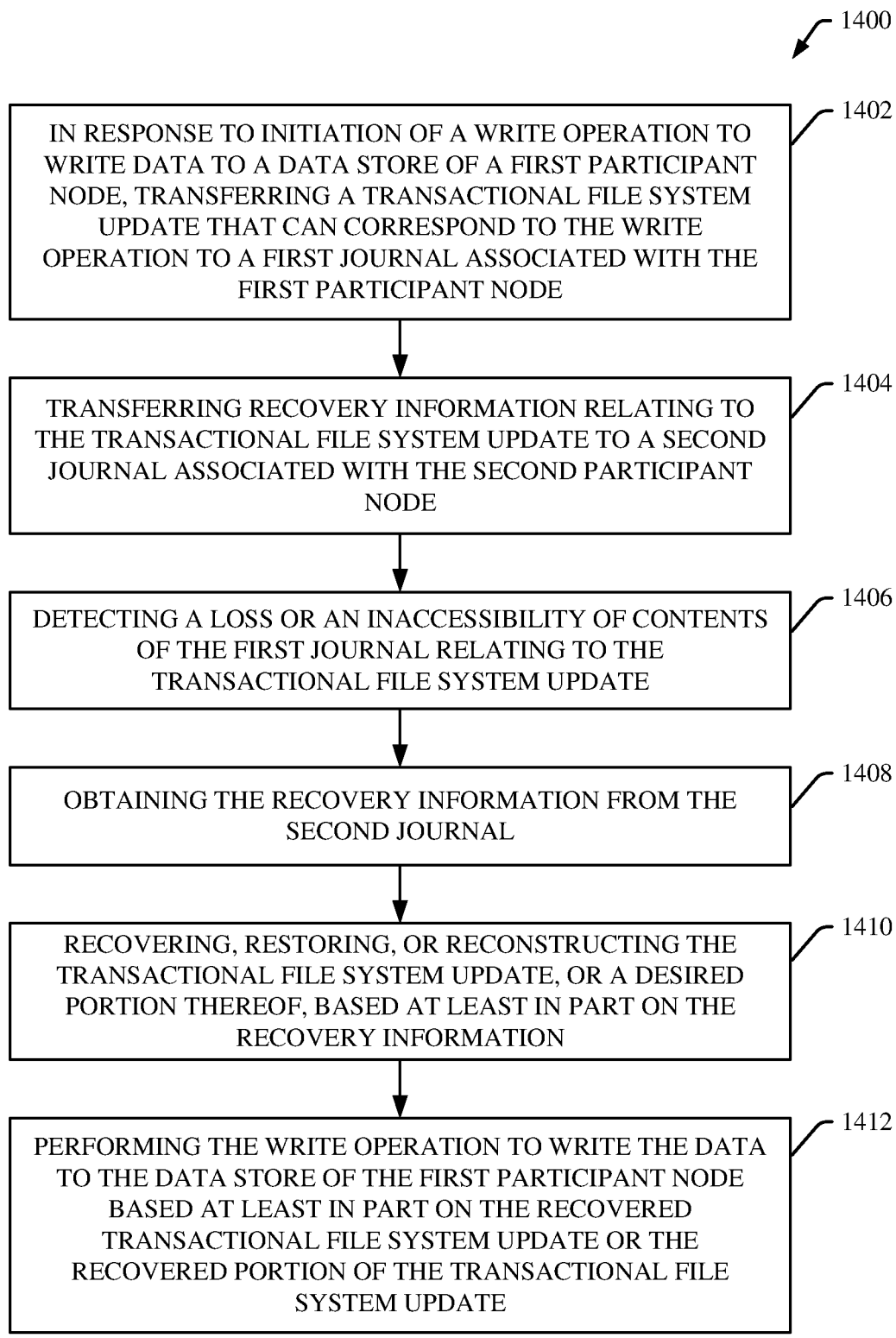
FIG. 14 depicts a flow diagram of an example method that can utilize recovery information relating to a transactional file system update stored in a second (e.g., buddy) journal of a second participant node to facilitate recovery of the transactional file system update that was lost or inaccessible at a first journal of a first participant node, in accordance with various aspects and embodiments of the disclosed subject matter.

In view of the example systems and/or devices described herein, example methods that can be implemented in accordance with the disclosed subject matter can be further appreciated with reference to flowcharts in FIGS. 12-14. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 12 depicts a flow diagram of an example method 1200 that can facilitate mirroring addresses of a file system journal to facilitate journal recovery if and when desired, in accordance with various aspects and embodiments of the disclosed subject matter. The method 1200 can be employed by, for example, a system comprising the initiator node, first participant node, second (e.g., buddy) participant node, a processor component(s) (e.g., of or associated with the initiator node, first participant node, second participant node, and/or third participant node), and/or data store(s) (e.g., of or associated with the initiator node, first participant node, second participant node, and/or third participant node).

At 1202, in connection with a write operation, a transactional file system update can be communicated from an initiator node to a first journal associated with a first node, wherein the transactional file system update can correspond to the write operation to be performed at the first node. The journal transfer component can communicate the transactional file system update from the initiator node to the first journal associated with the first node (e.g., first participant node).

At 1204, recovery data relating to the transactional file system update can be communicated from the initiator node to a second journal associated with a second node, wherein the recovery data can be determined based at least in part on the transactional file system update. The journal transfer component can communicate the recovery data relating to the transactional file system update from the initiator node to the second journal associated with the second node (e.g., second participant node). The recovery data can comprise, for example, state information relating to the state of the transaction, the first set of block addresses of the data store of the first participant node that is involved in the transaction, error correction-related information associated with the transaction, the second set of mirror block addresses associated with the third participant node, and/or other desired information, as more fully described herein. The error correction-related information can comprise, for example, information (e.g., LIN and offset information) relating to (e.g., that indicates or identifies) a data storage location(s) in a data store of a node (e.g., third node) where error correction information is stored, wherein such error correction information can be associated with the data being written to the first node as part of the transaction, and wherein the error correction information can be determined based at least in part on, and can be used to recover, at least a portion of the data.

FIG. 13 illustrates a flow diagram of another example method 1300 that can facilitate mirroring addresses and/or other desired recovery information of a file system journal to facilitate journal recovery if and when desired, in accordance with various aspects and embodiments of the disclosed subject matter. The method 1300 can be employed by, for example, a system comprising the initiator node, first participant node, second (e.g., buddy) participant node, a processor component(s) (e.g., of or associated with the initiator node, first participant node, second participant node, and/or third participant node), and/or data store(s) (e.g., of or associated with the initiator node, first participant node, second participant node, and/or third participant node).

At 1302, a transactional file system update that can correspond to a write operation to write data to a first participant node can be initiated. The initiator node can initiate the transactional file system update to facilitate performing the write operation to write data to the first participant node.

At 1304, recovery information relating to the transactional file system update can be generated based at least in part on information relating to the transactional file system update. The initiator node can analyze or parse the information relating to the transactional file system update. Based at least in part on the results of such analyzing or parsing, the initiator node can determine and/or generate the recovery information relating to the transactional file system update. The recovery information can comprise, for example, state information relating to the state of the transaction, the first set of block addresses of the data store of the first participant node that is involved in the transaction, error correction-related information associated with the transaction, the second set of mirror block addresses associated with the third participant node, and/or other desired information, as more fully described herein. The error correction-related information can comprise, for example, information (e.g., LIN and offset information) relating to a data storage location(s) in a data store of a node (e.g., third node) where error correction information is stored, wherein the error correction information can be associated with the data being written to the first participant node as part of the transactional file system update.

At 1306, a generation indicator associated with the first participant node and/or the transactional file system update can be obtained. The journal state component of the initiator node can determine or obtain the generation indicator associated with the first participant node and/or the transactional file system update, as more fully described herein.

At 1308, a first journal descriptor block for the first journal of or associated with the first participant node, and a second journal descriptor block for the second journal of or associated with the second participant node can be generated. The journal descriptor block generator component of the initiator node can generate (e.g., create) the first journal descriptor block for the first journal, and the second journal descriptor block for the second journal. The first journal descriptor block can comprise, for example, the transactional file system update, first size information that can indicate a first size of the first journal descriptor block, a first flag that can indicate a first purpose (e.g., used for a primary transaction) of the first journal descriptor block, and/or other desired information. The second journal descriptor block can comprise, for example, the recovery information, second size data that can indicate a second size of the second journal descriptor block, a second flag that can indicate a second purpose (e.g., used for a buddy transaction associated with the primary transaction) of the second journal descriptor block, and/or other desired information.

At 1310, a first transaction block for the first journal and a second transaction block for the second journal can be generated. The initiator node can generate (e.g., create) the first transaction block, comprising first metadata associated with the transaction, for the first journal, and can generate the second transaction block, comprising second metadata associated with the transaction, for the second journal, as more fully described herein.

At 1312, the generation indicator, the first transaction block, and the first journal descriptor block can be transferred to the first journal of or associated with the first participant node. At 1314, the generation indicator, the second transaction block, and the second journal descriptor block can be transferred to the second journal of or associated with the second participant node. The journal transfer component can transfer the generation indicator, the first transaction block, the first journal descriptor block, and/or other desired information to the first journal. The journal transfer component also can transfer the generation indicator, the second transaction block, the second journal descriptor block, and/or other desired information to the second journal.

At 1316, the transactional file system update can be committed to the first journal. The first participant node can commit the transactional file system update to the first journal, as described herein.

At 1318, the recovery information relating to the transactional file system update can be committed to the second journal. The second participant node can commit the recovery information relating to the transactional file system update to the second journal, as described herein. In some embodiments, the second participant node can be associated with a second domain that can be logically distinct and isolated from the first domain associated with the first participant node.

At 1320, the data of the transactional file system update can be written to a data store of the first participant node, in response to determining that the transactional file system update has been successfully committed to the first journal and the recovery information has been successfully committed to the second journal. For instance, in response to determining that the transactional file system update has been successfully committed to the first journal and the recovery information has been successfully committed to the second journal, the first participant node can write the data (e.g., write data or update data) of the transactional file system update to the data store of the first participant node.

At 1322, in response to determining the data has been successfully written to the data store of the first participant node, the transactional file system update can be removed from the first journal. For instance, in response to determining the data has been successfully written to the data store of the first participant node, the journal update component of the first participant node can remove (e.g., discard, delete, erase, or otherwise remove) the transactional file system update from the first journal, as more fully described herein.

At 1324, in response to determining the data has been successfully written to the data store of the first participant node, the recovery information relating to the transactional file system update can be removed from the second journal. For example, in response to determining the data has been successfully written to the data store of the first participant node, the journal update component of the second participant node can remove (e.g., discard, delete, erase, or otherwise remove) the recovery information from the second journal, as more fully described herein FIG. 14 depicts a flow diagram of an example method 1400 that can utilize recovery information relating to a transactional file system update stored in a second (e.g., buddy) journal of a second participant node to facilitate recovery of the transactional file system update that was lost or inaccessible at a first journal of a first participant node, in accordance with various aspects and embodiments of the disclosed subject matter. The method 1400 can be employed by, for example, a system comprising the initiator node, first participant node, second (e.g., buddy) participant node, a processor component(s) (e.g., of or associated with the initiator node, first participant node, second participant node, and/or third participant node), and/or data store(s) (e.g., of or associated with the initiator node, first participant node, second participant node, and/or third participant node).

At 1402, in response to initiation of a write operation to write data to a data store of a first participant node, a transactional file system update that can correspond to the write operation can be transferred to a first journal associated with the first participant node. The initiator node can initiate the transactional file system update to facilitate performing the write operation to write data to the data store of the first participant node. The initiator node can transfer the transactional file system update and associated information (e.g., generation indicator, metadata, . . . ) to the first journal associated with the first participant node, as more fully described herein.

At 1404, recovery information relating to the transactional file system update can be transferred to a second journal associated with the second participant node. The initiator node can transfer the recovery information relating to the transactional file system update and associated information (e.g., generation indicator, metadata, . . . ) to the second journal associated with the second participant node, as more fully described herein.

At 1406, a loss or an inaccessibility of contents of the first journal relating to the transactional file system update can be detected. The first participant node and/or initiator node can detect or determine that contents of the first journal relating to the transactional file system update have been lost or are otherwise inaccessible.

At 1408, the recovery information can be obtained from the second journal. In response to detecting that the contents of the first journal relating to all or a portion of the transactional file system update have been lost or are otherwise inaccessible, a journal restoration component of the first participant node can obtain, retrieve, or receive the recovery information relating to the transactional file system update from the second journal. The recovery information can comprise, for example, state information relating to the state of the transaction, the first set of block addresses of the data store of the first participant node that is involved in the transaction, error correction-related information associated with the transaction, the second set of mirror block addresses associated with the third participant node, and/or other desired information, as more fully described herein. The error correction-related information can comprise, for example, information (e.g., LIN and offset information) relating to a data storage location(s) in a data store of a node (e.g., third participant node) where the error correction information associated with the write operation is stored.

At 1410, the transactional file system update, or desired portion thereof, can be recovered, restored, or reconstructed based at least in part on the recovery information. For instance, based at least in part on the results of analyzing and/or reading the recovery information, the journal restoration component can recover, restore, or reconstruct the transactional file system update, or portion thereof (e.g., portion of the transactional file system update relating to the lost or inaccessible contents of the first journal), to generate a recovered transactional file system update, or portion thereof, as more fully described herein.

At 1412, the write operation to write the data to the data store of the first participant node can be performed based at least in part on the recovered transactional file system update, or recovered portion of the transactional file system update. The first participant node can execute the transactional file system update to facilitate performing the write operation to write the data to the data store, based at least in part on the recovered transactional file system update or the recovered portion of the transactional file system update.

Figure 15:
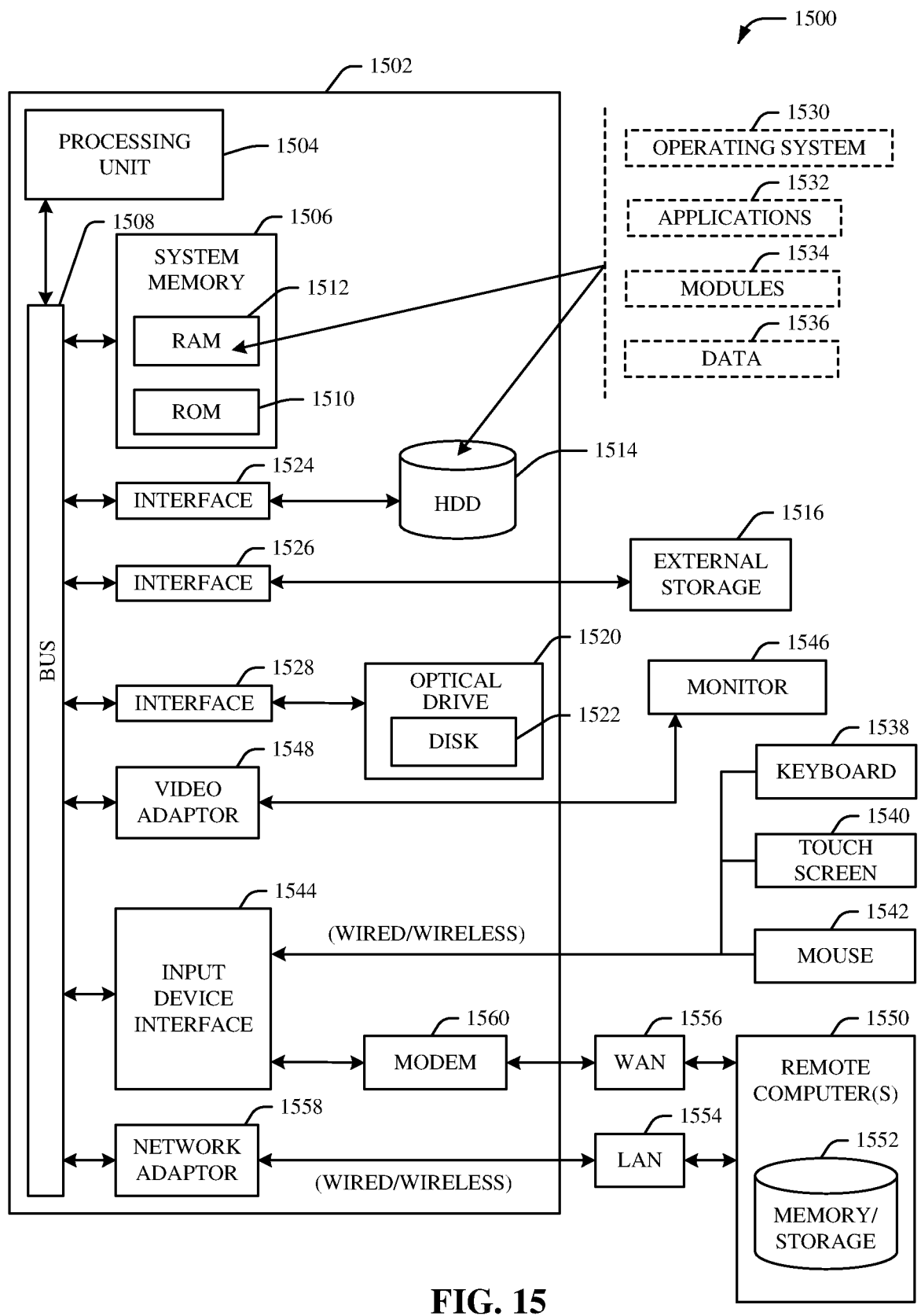
FIG. 15 is a diagram of an example computing environment in which various embodiments described herein can function.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD), a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556, e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   in connection with a write operation, communicating, by a system comprising a processor, a transactional file system update from an initiator node to a first journal associated with a first node, wherein the transactional file system update corresponds to the write operation to be performed at the first node; and
   communicating, by the system, recovery data relating to the transactional file system update from the initiator node to a second journal associated with a second node, wherein the recovery data is determined based at least in part on the transactional file system update, wherein the recovery data comprises a first group of block addresses and a second group of mirror block addresses, wherein the first group of block addresses is associated with the transactional file system update and the first node, wherein the first group of block addresses is to be updated to store data of the write operation in the first node, wherein the second group of mirror block addresses is associated with a third node and mirrors the data to be stored in the first group of block addresses in connection with the transactional file system update, and wherein the recovery data does not comprise the data.

2. The method of claim 1, wherein the recovery data comprises at least three of a state of a transaction associated with the transactional file system update, the first group of block addresses associated with the transactional file system update, error correction-related data relating to error correction information associated with the transactional file system update, or the second group of mirror block addresses, and wherein the error correction-related information indicates a storage location where the error correction information is stored.

3. The method of claim 2, further comprising:
generating, by the system, a first journal descriptor block that comprises the transactional file system update, first size data that indicates a first size of the first journal descriptor block, and a first flag that indicates a first purpose of the first journal descriptor block; and
generating, by the system, a second journal descriptor block that comprises the recovery data, second size data that indicates a second size of the second journal descriptor block, and a second flag that indicates a second purpose of the second journal descriptor block.

4. The method of claim 1, further comprising:
in response to generating or receiving the transactional file system update corresponding to the write operation, obtaining, by the system, a generation indicator,
wherein the communicating of the transactional file system update comprises communicating the generation indicator, a first transaction block, and a first journal descriptor block to the first node, wherein the first journal descriptor block comprises the transactional file system update, wherein the first transaction block is linked with the first journal descriptor block, and wherein the first transaction block comprises first metadata relating to the transactional file system update, and
wherein the communicating of the recovery data comprises communicating the generation indicator, a second transaction block, and a second journal descriptor block to the second node, wherein the second journal descriptor block comprises the recovery data, wherein the second transaction block is linked with the second journal descriptor block and is linked with global transaction data of the second journal, and wherein the second transaction block comprises second metadata relating to the transactional file system update.

5. The method of claim 4, further comprising:
storing, by the system, the generation indicator in a storage location that is located outside of a first domain associated with the first node and a second domain associated with the second node.

6. The method of claim 4, further comprising:
updating, by the system, the generation indicator in response to identifying a change in operational state of at least one of the initiator node, the first node, or the second node.

7. The method of claim 4, wherein the generation indicator is a first generation indicator, and wherein the method further comprises:
in response to at least one of the first node or the second node being associated with a second generation indicator that is different from the first generation indicator, aborting, by the system, commitment of the transactional file system update to the first journal and the recovery data to the second journal.

8. The method of claim 1, further comprising:
committing, by the system, the transactional file system update to the first journal, wherein the first journal comprises a first journal data store that stores the transactional file system update; and
committing, by the system, the recovery data to the second journal, wherein the second journal comprises a second journal data store that stores the recovery data, wherein the first node is associated with a first domain, and wherein the second node is associated with a second domain that is logically distinct and separate from the first domain.

9. The method of claim 8, further comprising:
in response to determining that the transactional file system update has been successfully committed to the first journal and the recovery data has been successfully committed to the second journal, writing, by the system, the transactional file system update to a data store of the first node; and
in response to the transactional file system update being successfully written to the data store of the first node:
removing, by the system, the transactional file system update from the first journal; and
removing, by the system, the recovery data from the second journal.

10. The method of claim 8, further comprising:
executing, by the system, a two-phase commit transaction to facilitate the committing of the transactional file system update to the first journal and the committing of the recovery data to the second journal, wherein the transaction file system update comprises two-phase commit transaction information and information relating to one or more updates to one or more storage blocks associated with the first node.

11. The method of claim 1, further comprising:
in response to determining that the transactional file system update is unavailable to use to facilitate performing the write operation to write data of the transactional file system update to a data store of the first node, retrieving, by the system, the recovery data from the second journal; and
restoring, by the system, the transactional file system update, based at least in part on the recovery data, to facilitate the performing of the write operation to write the data to the data store of the first node.

12. A system, comprising:
a memory that stores computer executable components; and
a processor that executes computer executable components stored in the memory, wherein the computer executable components comprise:
a write processor component that generates a transactional file system update corresponding to a write operation to be performed at a first participant node of a data storage system; and
a journal transfer component that transfers the transactional file system update from an initiator node of the data storage system to a first journal associated with the first participant node and recovery information relating to the transactional file system update to a second journal associated with a second participant node of the data storage system, wherein the recovery information is determined based at least in part on the transactional file system update, wherein the recovery information comprises a first set of block addresses associated with the transactional file system update, and a second set of mirror block addresses, wherein the first set of block addresses is to be updated to store data of the write operation in the first participant node, wherein the second set of mirror block addresses is associated with a third participant node and mirrors the data to be stored in the first set of block addresses as part of the transactional file system update, and wherein the recovery information does not contain the data.

13. The system of claim 12, wherein the recovery information comprises at least three of a state of a transaction associated with the transactional file system update, the first set of block addresses associated with the transactional file system update, error correction-related information relating to error correction information associated with the transactional file system update, or the second set of mirror block addresses, and wherein the error correction-related information indicates a data storage location where the error correction information is stored.

14. The system of claim 12, wherein the computer executable components further comprise:
a journal descriptor block generator component that generates a first journal descriptor block that comprises the transactional file system update, first size information that indicates a first size of the first journal descriptor block, and a first flag that indicates a first purpose of the first journal descriptor block,
wherein the journal descriptor block generator component generates a second journal descriptor block that comprises the recovery information, second size data that indicates a second size of the second journal descriptor block, and a second flag that indicates a second purpose of the second journal descriptor block.

15. The system of claim 12, wherein the computer executable components further comprise:
a journal state component that obtains a generation indicator associated with the transactional file system update,
wherein the journal transfer component transfers the generation indicator, a first transaction block, and a first journal descriptor block to the first participant node, wherein the first journal descriptor block comprises the transactional file system update, wherein the first transaction block is associated with the first journal descriptor block, and wherein the first transaction block comprises first metadata relating to the transactional file system update, and
wherein the journal transfer component transfers the generation indicator, a second transaction block, and a second journal descriptor block to the second node, wherein the second journal descriptor block comprises the recovery information, wherein the second transaction block is associated with the second journal descriptor block and is associated with global transaction information of the second journal, and wherein the second transaction block comprises second metadata relating to the transactional file system update.

16. The system of claim 12, wherein the computer executable components further comprise:
a journal commit component that commits the transactional file system update to the first journal and commits the recovery information to the second journal, wherein the first journal comprises a first journal data store that stores the transactional file system update, wherein the second journal comprises a second journal data store that stores the recovery information, wherein the first participant node is associated with a first domain, and wherein the second participant node is associated with a second domain that is logically distinct and isolated from the first domain.

17. The system of claim 16, wherein the computer executable components further comprise:
a write component that writes data of the transactional file system update to a data store of the first participant node, in response to a first determination that the transactional file system update has been successfully committed to the first journal and the recovery information has been successfully committed to the second journal; and
a journal update component that deletes the transactional file system update from the first journal, and deletes the recovery information from the second journal, in response to a second determination that the data has been successfully written to the data store of the first participant node.

18. The system of claim 12, wherein the computer executable components further comprise:
a restoration component that, in response to a determination that the transactional file system update is inaccessible for use to facilitate performance of the write operation to write data of the transactional file system update to a data store of the first participant node, obtains the recovery information from the second journal, and, based at least in part on the recovery information, restores the transactional file system update, to facilitate the performance of the write operation to write the data to the data store of the first participant node.

19. A non-transitory machine-readable medium, comprising executable instructions that, when executed by a processor, facilitate performance of operations, comprising:
in connection with a write operation, transmitting transactional file system update information from an initiator node to a first journal data store associated with a first node, wherein the transactional file system update information corresponds to the write operation to be performed at the first node; and
transmitting recovery information relating to the transactional file system update information from the initiator node to a second journal data store associated with a second node, wherein the recovery information is determined based at least in part on the transactional file system update information, wherein the recovery information comprises a first set of block addresses associated with the transactional file system update information, and a second set of mirror block addresses, wherein the first set of block addresses is to be updated to store data of the write operation, wherein the second set of mirror block addresses is associated with a third participant node and mirrors the data to be stored in the first set of block addresses in connection with the transactional file system update information, and wherein the recovery information does not comprise the data.

20. The non-transitory machine-readable medium of claim 19, wherein the operations further comprise:
generating a first journal descriptor block that comprises the transactional file system update information, a first size of the first journal descriptor block, and a first flag that indicates a first purpose of the first journal descriptor block; and
generating a second journal descriptor block that comprises the recovery information, a second size of the second journal descriptor block, and a second flag that indicates a second purpose of the second journal descriptor block, wherein the recovery information comprises at least three of a state of a transaction associated with the transactional file system update information, the first set of block addresses associated with the transactional file system update information, error correction-related information relating to error correction data associated with the transactional file system update information, or the second set of mirror block addresses, wherein the transmitting of the transactional file system update information comprises transmitting a first transaction block and the first journal descriptor block to the first node, wherein the first transaction block is linked with the first journal descriptor block, and wherein the first transaction block comprises first metadata relating to the transactional file system update information, and wherein the transmitting of the recovery information comprises transmitting a second transaction block and the second journal descriptor block to the second node, wherein the second transaction block is linked with the second journal descriptor block and is linked with global transaction information of the second journal, and wherein the second transaction block comprises second metadata relating to the transactional file system update information.

\* \* \* \* \*